United States Patent
Dopp

(10) Patent No.: US 11,560,716 B2
(45) Date of Patent: Jan. 24, 2023

(54) METHODS AND APPARATUSES FOR FACILITATING PRODUCING OF AN INSULATED PANEL

(71) Applicant: Philip Ray Dopp, Pinole, CA (US)

(72) Inventor: Philip Ray Dopp, Pinole, CA (US)

(73) Assignee: Philip Ray Dopp, Pinole, CA (US)

( * ) Notice: Subject to any disclaimer, the term of this patent is extended or adjusted under 35 U.S.C. 154(b) by 143 days.

(21) Appl. No.: 16/938,083

(22) Filed: Jul. 24, 2020

(65) Prior Publication Data

US 2021/0025166 A1 Jan. 28, 2021

Related U.S. Application Data

(60) Provisional application No. 62/877,927, filed on Jul. 24, 2019.

(51) Int. Cl.
| | |
|---|---|
| *E04C 2/38* | (2006.01) |
| *E04C 5/08* | (2006.01) |
| *B32B 3/02* | (2006.01) |
| *E04C 2/288* | (2006.01) |
| *E04C 2/32* | (2006.01) |

(Continued)

(52) U.S. Cl.
CPC .................. *E04C 2/38* (2013.01); *B32B 3/02* (2013.01); *B32B 5/18* (2013.01); *B32B 5/245* (2013.01); *B32B 9/046* (2013.01); *E04C 2/288* (2013.01); *E04C 2/326* (2013.01); *E04C 5/08* (2013.01); *B32B 2307/304* (2013.01); *B32B 2419/00* (2013.01)

(58) Field of Classification Search
CPC . E04C 2/38; E04C 2/288; E04C 2/326; E04C 5/08; E04C 2/06; E04C 2/32; B32B 3/02; B32B 5/18; B32B 5/245; B32B 9/046; B32B 2307/304; B32B 3/06; B32B 3/30; B32B 15/046; B32B 2250/05; B32B 2307/206; B32B 2419/06; B32B 2607/00; B32B 3/18; B32B 2250/40; B32B 13/045; B32B 15/02; B32B 2307/102; E32B 2419/00
See application file for complete search history.

(56) References Cited

U.S. PATENT DOCUMENTS

| | | |
|---|---|---|
| 2,055,804 A | 9/1936 | Albert |
| 4,125,981 A | 11/1978 | MacLeod |
| | (Continued) | |

FOREIGN PATENT DOCUMENTS

EP 0061100 A3 2/1983

*Primary Examiner* — Phi D A

(57) ABSTRACT

Disclosed herein is an insulated panel for facilitating post-tensioning of the insulated panel, in accordance with some embodiments. Accordingly, the insulated panel may include a frame, a first layer, a second layer, a second layer, a third layer, a fourth layer, and a fifth layer. Further, the frame may include a frame-end arranged in an arrangement forming an interior space. Further, the first layer of a building material is disposed in the interior space. Further, the second layer of an insulating material is disposed on the first layer. Further, the third layer of a cable is disposed on the second layer. Further, the fourth layer of the insulating material is disposed on the third layer. Further, the fifth layer of the building material is disposed on the fourth layer. Further, at least one of the first layer and the fifth layer may be cured for producing the insulated panel.

10 Claims, 28 Drawing Sheets

(51) Int. Cl.
*B32B 5/18* (2006.01)
*B32B 5/24* (2006.01)
*B32B 9/04* (2006.01)

(56) References Cited

U.S. PATENT DOCUMENTS

| | | | | |
|---|---|---|---|---|
| 4,338,759 | A * | 7/1982 | Swerdlow | E04B 1/165 |
| | | | | 52/742.14 |
| 4,532,745 | A * | 8/1985 | Kinard | E04B 2/8629 |
| | | | | 52/439 |
| 4,627,203 | A | 12/1986 | Presswalla et al. | |
| 4,731,971 | A * | 3/1988 | Terkl | E04C 2/40 |
| | | | | 52/79.11 |
| 5,168,681 | A | 12/1992 | Ayrapetyan | |
| 5,678,373 | A | 10/1997 | Franklin | |
| 6,857,241 | B1 | 2/2005 | Pellicer | |
| 7,421,828 | B2 * | 9/2008 | Reynolds | E04B 1/7612 |
| | | | | 52/319 |
| 8,935,892 | B2 | 1/2015 | Buchanan | |
| 10,577,798 | B1 * | 3/2020 | Hodgson | E04B 2/68 |
| 2001/0015039 | A1 | 8/2001 | Zambelli | |
| 2002/0129574 | A1 * | 9/2002 | Newhouse | B25B 5/003 |
| | | | | 52/239 |
| 2006/0101779 | A1 | 5/2006 | Lejeune | |
| 2008/0098676 | A1 | 5/2008 | Hutchens | |
| 2008/0115442 | A1 * | 5/2008 | Cheng | B32B 13/04 |
| | | | | 52/745.13 |
| 2012/0282025 | A1 | 11/2012 | French | |
| 2014/0150361 | A1 * | 6/2014 | Castonguay | E04B 2/18 |
| | | | | 52/742.16 |
| 2016/0069063 | A1 | 3/2016 | Harvey | |
| 2018/0119418 | A1 * | 5/2018 | Breaz | E04C 1/40 |
| 2021/0040729 | A1 * | 2/2021 | Glen | B32B 15/20 |

* cited by examiner

METHODS AND APPARATUSES FOR FACILITATING PRODUCING OF AN INSULATED PANEL

The current application claims a priority to the U.S. Provisional Patent application Ser. No. 62/877,927 filed on Jul. 24, 2019.

FIELD OF THE INVENTION

Generally, the present disclosure relates to the field of building units and construction elements. More specifically, the present disclosure relates to methods and apparatuses for facilitating producing of an insulated panel.

BACKGROUND OF THE INVENTION

Currently, building practices have not changed much in present society. Most building practices involving panels of cementitious materials are often tensioned with precast steel cables. There has been advancement in such common building practices. Also, with such materials, current building practices often may not produce solid and/or well-insulated walls that are under constant tension.

Therefore, there is a need for improved methods and apparatuses for facilitating producing of an insulated panel that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an insulated panel for facilitating post-tensioning of the insulated panel, in accordance with some embodiments. Accordingly, the insulated panel may include a frame, a first layer, a second layer, a second layer, a third layer, a fourth layer, and a fifth layer. Further, the frame may include at least one frame-end arranged in at least one arrangement forming an interior space. Further, the at least one arrangement corresponds to at least one shape of the insulated panel produced using the frame. Further, a first end of the at least one frame-end may be coupled with a second end of the at least one frame-end. Further, the first layer of a building material may be disposed in the interior space. Further, the second layer of an insulating material may be disposed on the first layer. Further, the second layer may be adjacent to the first layer. Further, the third layer of at least one cable may be disposed on the second layer. Further, the third layer may be adjacent to the second layer. Further, the fourth layer of the insulating material may be disposed on the third layer. Further, the fourth layer may be adjacent to the third layer. Further, the fifth layer of the building material may be disposed on the fourth layer. Further, the fifth layer may be adjacent to the fourth layer. Further, at least one of the first layer and the fifth layer may be cured for producing the insulated panel. Further, the at least one cable may be tensioned to at least one specification based on the producing.

Further disclosed herein is a method for producing an insulated panel for facilitating post-tensioning of the insulated panel, in accordance with some embodiments. Accordingly, the method may include a step of arranging at least one frame-end of a frame in at least one arrangement forming an interior space. Further, the method may include a step of disposing a first layer of a building material in the interior space. Further, the method may include a step of disposing a second layer of an insulating material on the first layer. Further, the method may include a step of disposing a third layer of at least one cable on the second layer. Further, the method may include a step of disposing a fourth layer of the insulating material on the third layer. Further, the method may include a step of disposing a fifth layer of the building material disposed on the fourth layer. Further, the method may include a step of curing at least one of the first layer and the fifth layer for producing the insulated panel.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
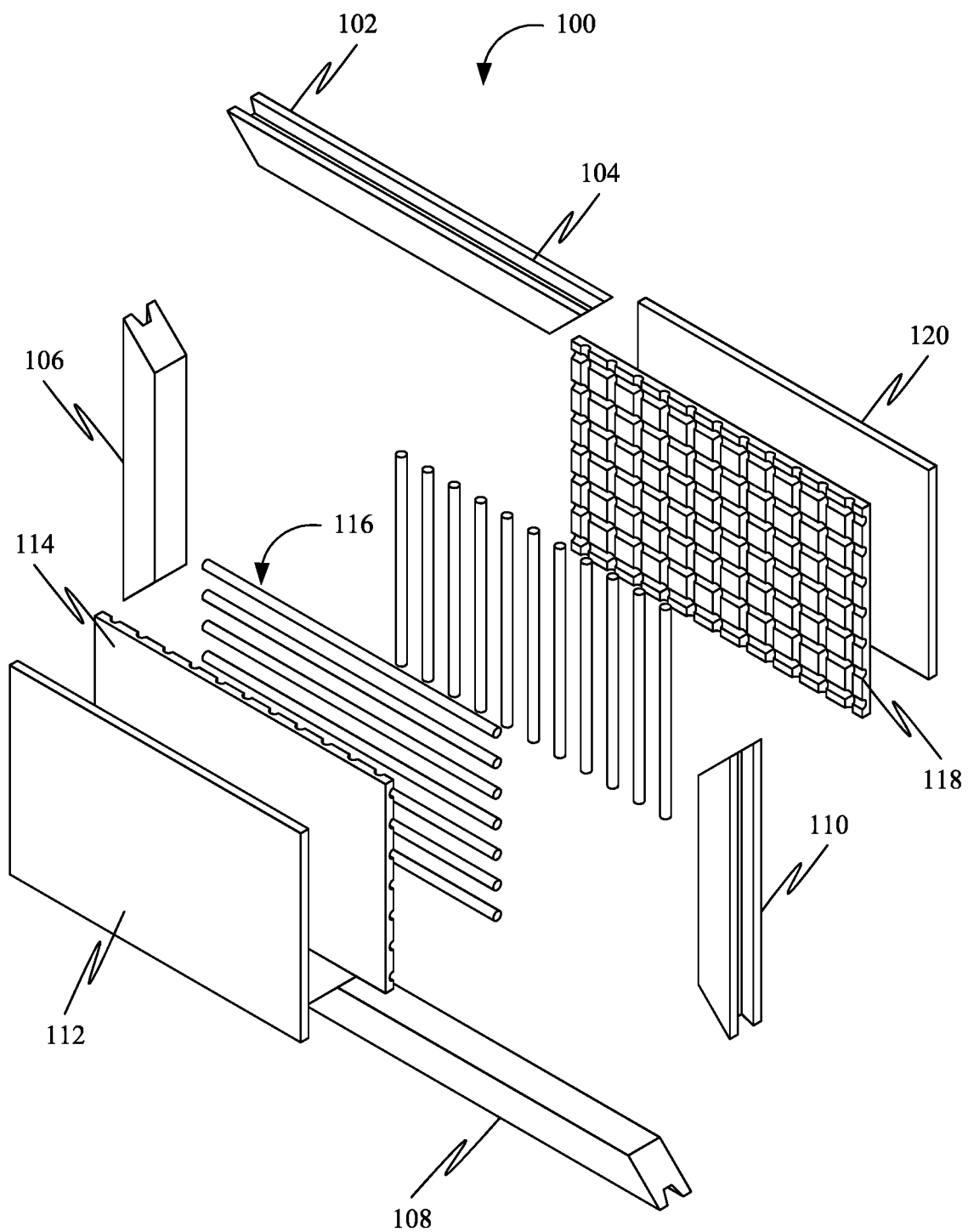
FIG. 1 is an exploded view of an insulated panel for facilitating post-tensioning of the insulated panel, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and apparatuses for facilitating producing of an insulated panel, embodiments of the present disclosure are not limited to use only in this context.

Overview:

The present disclosure describes a method used for constructing post-tensioned, precast and insulated panels. Further, the panel (the insulated panel) may be of any shape, size, material, features, type or kind, orientation, location, quantity, components, and arrangements of components. However, it may be preferred that the panel is of wall thickness that is relatively smaller with respect to the overall length and/or width of the panel. Further, the panel is of a type or kind similar to, but not limited to, the following: walls, floorings, roofs, ceilings, and/or other similarly related objects. Further, the panel may be of a shape nonrelated to a flat-walled structure such as a curved-shaped wall structure, a spline-shaped wall structure, and/or other similarly related objects. The panel primarily contains a first layer through a fifth layer, a first frame-end through a fourth frame-end, and a plurality of dividers.

Further, the panel contains a first layer through a fifth layer. The first layer through the fifth layer may be of any shape, size, material, features, type or kind, orientation, location, quantity, components, and arrangements of components. However, it may be preferred that the first through the fifth layer be similar to each other in shape, size, features, orientation, quantity, components, and arrangements of components. It may be preferred that the first layer be located furthest on one face of the panel with each layer sequentially placed adjacently further from the first layer, such that the first layer through the fifth layer of the panel may be arranged in the following manner: the first layer, followed by the second layer, followed by the third layer, a followed by the fourth layer, and then followed by the fifth layer. It may be preferred that the first layer is of a material similar to ECC material. It may be preferred that the second layer is of a material similar to foam-like materials similar to insulating foam and other similarly related materials. It may be preferred that the third layer be such that the third layer is a network grid of cables. It may be preferred that the network grid of cables of the third layer be of a material or materials similar to and/or compatible with the material of the apparatus, such as galvanized wire rope or other similarly related materials. It may be preferred that the fourth layer is of a material similar to the material of the second layer. It may be that the fourth layer is such that the fourth layer is similar to a partial layering or covering of material cut out from the second layer over the network grid of cables. It may be preferred that the fifth layer be identical to the first layer in shape, size, material, features, type or kind, orientation, quantity, components, and arrangements of components.

Further, the panel contains a first frame-end through a fourth frame-end. The first frame-end through the fourth frame-end may be of any shape, size, material, features, type or kind, orientation, location, quantity, components, and arrangements of components. However, it may be preferred that the first frame-end through the fourth frame-end be of a material that is similar to and/or compatible with the panel, while also being strong, durable, tough, lightweight, easily manufacturable, environmentally sustainable, and/or weather resistant. It may be preferred that the first frame-end be of a type or kind similar to a W-channel bracket or a similarly related object. It may be preferred that the first frame-end be of a shape similar to one side face of a panel where the first frame-end may be located on the panel. It may be preferred that the first frame-end be located and mounted at a side face of the panel. It may be preferred that the second frame-end be similar to the first frame-end in shape, size, material, features, type or kind, orientation, quantity, components, and arrangements of components. It may be preferred that the second frame-end be located on and mounted onto a side face of the panel opposite from the location of the first frame-end. It may be preferred that the third frame-end is similar to the first frame-end in shape, size, material, features, type or kind, quantity, components, and arrangements of components. It may be preferred that the third frame-end be located at and mounted onto a side face of the panel that is between two opposing side faces of the panel. It may be preferred that the third frame-end be of a shape similar to the shape of the side face of the panel to which the third frame-end is located at. It may be preferred that the fourth frame-end be similar to the third frame-end in shape, size, material, features, type or kind, orientation, quantity, components, and arrangements of components.

Further, the panel contains a plurality of dividers. The plurality of dividers may be of any shape, size, material, features, type or kind, orientation, location, quantity, components, and arrangements of components. However, it may be preferred that the plurality of dividers be located between two opposing side faces of the panel. It may be preferred that the plurality of dividers contain a plurality of channels that begins from a side face of the plurality of dividers and ends at two adjacent side faces of the plurality of dividers that may be mirrored from one another and adjacent to the face of the plurality of dividers that contains the beginning of the plurality of channels such that, as fluid material is flowing through the plurality of channels, said fluid material may easily be dispersed throughout the panel.

Further, the panel may contain a variety of additional features. Such features may include, but not limited to, the following: window openings, door openings, electrical fixtures, electrical conduits, plumbing lines, and/or other mechanical parts or features. Further, the method may be utilized to produce a post-tensioned beam made of similar materials as the materials of the panel with little to no modification on the method.

Further, an objective of the present disclosure is to provide users with a method for constructing post-tensioned, precast, and insulated panels. The present disclosure intends to provide users with a means to construct panels utilizing non-traditional building materials like ECC and such. The present disclosure intends to provide users with a means of constructing panels in an environmentally sustainable fashion while utilizing said materials. The present disclosure intends to provide users with a means of flexibly constructing panels of various shapes and sizes.

Further, the present disclosure describes a method for constructing post-tensioned, precast, and insulated panels. The present disclosure contains a panel and a method. The panel may primarily contain five layers in the following arrangement: a layer of ECC material, a layer of foam material, a layer containing a network grid of cables, another layer of foam material, and another layer of ECC material. The panel also contains at least four frame-ends at four adjacent faces of the panel, preferably those faces that contain the smaller surface area. Additionally, the panel contains a plurality of dividers that is intermediary and in between to the medial surfaces of any two, opposing frame-ends. The method of the present disclosure describes steps in which the frame-ends may be mounted together to each other upon a cradle. A layer of filler material, followed by a layer of foam material, is then placed upon the surface of the cradle where available. A grid of grooves is cut out upon the exposed surface of the layer of foam material, with the cut-out portions being set aside for later use. Then, a network grid of cables is placed within the gird of grooves. Next, the leftover cut-out portions that was set aside previously, is placed upon the network grid of cables, culminating in the fourth layer of the panel. Then, a layer of ECC material is placed upon the exposed surface of the panel containing the fourth layer of the panel. When that layer of ECC material is cured, the cradle and the layer of filler material is removed from the panel. The exposed surface of the second layer is applied with a layer of ECC material. When that layer is cured, the network grid of cables is then tensioned to specification.

Further, the present disclosure relates generally to methods of building construction. More specifically, the present disclosure describes a method for constructing post-tensioned, precast, and insulated panels.

FIG. 1 is an exploded view of an insulated panel 100 for facilitating post-tensioning of the insulated panel 100, in accordance with some embodiments. Further, the insulated panel 100 may include a frame 102, a first layer 112, a second layer 114, a third layer 116, a fourth layer 118, and a fifth layer 120. Further, the insulated panel 100 may be associated with a panel length, a panel breadth, and a panel width. Further, the panel width may be smaller than at least one of the panel length and the panel breadth. Further, the insulated panel 100 may include a wall panel, a floor panel, a roof panel, a ceiling panel, etc.

Further, the frame 102 may include at least one frame-end 104-110 arranged in at least one arrangement forming an interior space. Further, the at least one arrangement corresponds to at least one shape of the insulated panel 100 produced using the frame 102. Further, a first end of the at least one frame-end 104-110 may be coupled with a second end of the at least one frame-end 104-110. Further, the at least one shape may include a flat-walled structure, a curved-shaped wall structure, a spline-shaped wall structure, etc. Further, in an embodiment, the at least one frame-end 104-110 may include a W-channel bracket.

Further, the first layer 112 of a building material may be disposed in the interior space. Further, the building material may include bendable concrete material. Further, an embodiment, the building material may include engineered cementitious composite (ECC) material. Further, the engineered cementitious composite material provides flexibility to the insulated panel 100.

Further, the second layer 114 of an insulating material may be disposed on the first layer 112. Further, the second layer 114 may be adjacent to the first layer 112. Further, the insulating material may be configured for providing thermal insulation, electrical insulation, sound insulation, etc.

Further, the third layer 116 of at least one cable may be disposed on the second layer 114. Further, the third layer 116 may be adjacent to the second layer 114. Further, the at least one cable may include at least one wire. Further, the at least one wire may be comprised of at least one material. Further, the at least one material may include metal, alloy, etc.

Further, the fourth layer 118 of the insulating material may be disposed on the third layer 116. Further, the fourth layer 118 may be adjacent to the third layer 116.

Further, the fifth layer 120 of the building material may be disposed on the fourth layer 118. Further, the fifth layer 120 may be adjacent to the fourth layer 118. Further, at least one of the first layer 112 and the fifth layer 120 may be cured for producing the insulated panel 100. Further, the at least one cable may be tensioned to at least one specification based on the producing.

Further, in some embodiments, the frame 102 may include at least one frame side corresponding to the at least one frame-end 104-110. Further, the insulated panel 100 may include at least one panel side corresponding to the at least one frame side.

Further, in some embodiments, a plurality of dividers may be disposed between a first frame side of at least one frame side of the frame 102 and a second frame side of the at least one frame side. Further, the first frame side opposes the second frame side. Further, the plurality of dividers may include a plurality of channels. Further, a channel of the plurality of channels extends from a side face of a first divider of the plurality of dividers to a second divider of the plurality of dividers and a third divider of the plurality of dividers. Further, the second divider and the third divider may be disposed adjacently to the side face of the first divider. Further, the plurality of channels facilitates dispersing of a fluid material throughout the insulated panel 100. Further, the building material may include the fluid material.

Further, in some embodiments, the at least one frame-end 104-110 may include a first frame-end, a second frame-end, a third frame-end, and a fourth frame-end. Further, the first frame-end, the second frame-end, the third frame-end, and the fourth frame-end may be disposed adjacently forming the frame 102. Further, the first frame-end may be disposed on a first side of the insulated panel 100. Further, the second frame-end may be disposed on a second side of the insulated panel 100. Further, the third frame-end may be disposed on a third side of the insulated panel 100. Further, the fourth frame-end may be disposed on a fourth side of the insulated panel 100.

Figure 4:
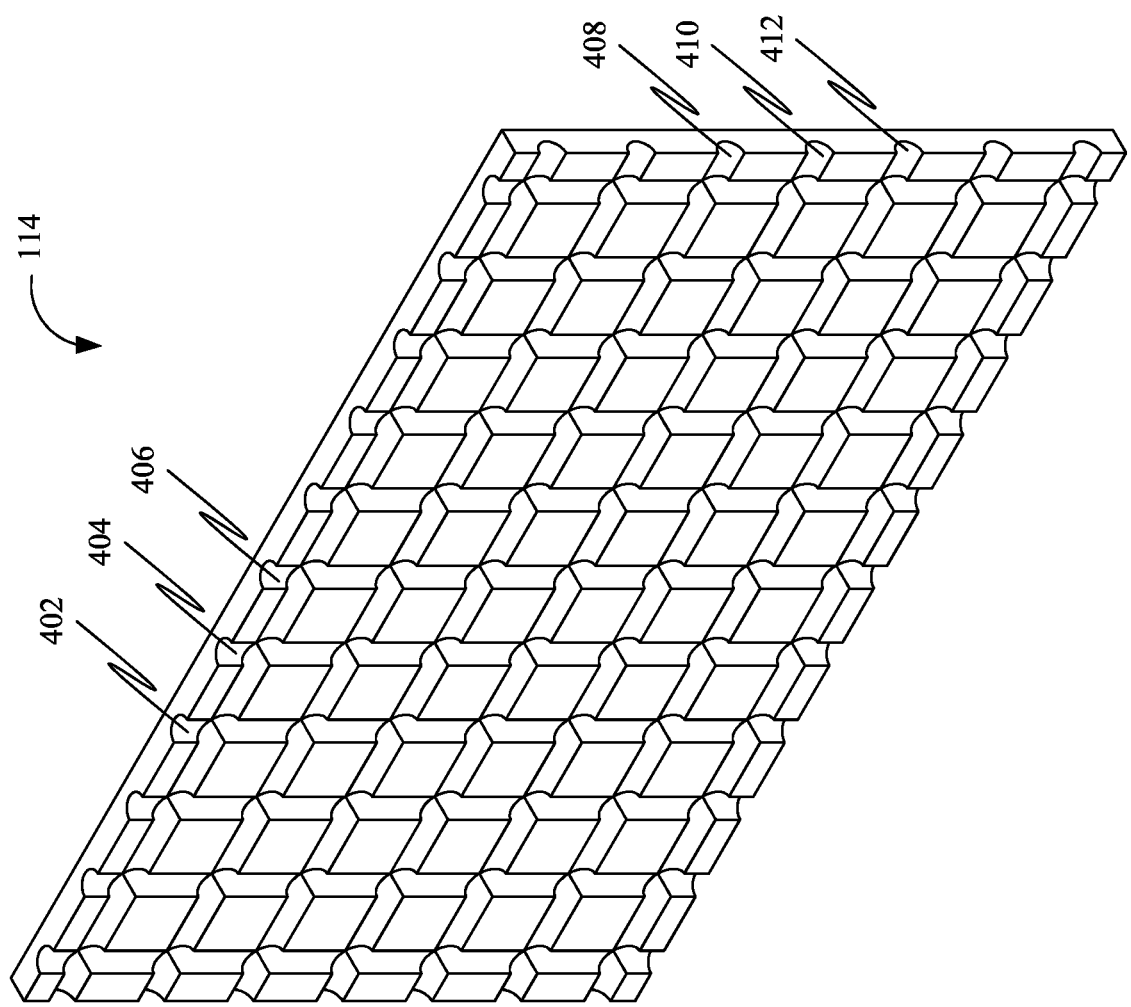
FIG. 4 is a perspective view of the second layer of the insulated panel, in accordance with some embodiments.

Further, in some embodiments, at least one of the second layer 114 and the fourth layer 118 may include at least one groove 402-412, as shown in FIG. 4, disposed on at least one of a first surface of the second layer 114 and a second surface of the fourth layer 118. Further, the at least one of the first surface and the second surface may be adjacent to the third layer 116. Further, the at least one cable may be disposed on the at least one groove 402-412. Further, in an embodiment, the insulating material of the at least one of the second layer 114 and the fourth layer 118 may include foam material. Further, the at least one groove 402-412 may be cut into the at least one of the first surface and the second surface.

Further, in some embodiments, the at least one frame-end 104-110 may be arranged in a first arrangement of the at least one arrangement forming at least one first interior space and at least one first opening leading into the at least one first interior space. Further, the interior space may include the at least one first interior space. Further, at least one of the first layer 112, the second layer 114, the third layer 116, the fourth layer 118, and the fifth layer 120 may be not disposed on the at least one first interior space.

Further, in some embodiments, the at least one cable may be arranged in a network grid of the at least one cable. Further, the insulated panel 100 may be tensioned to the at least one specification based on the network grid.

Figure 2:
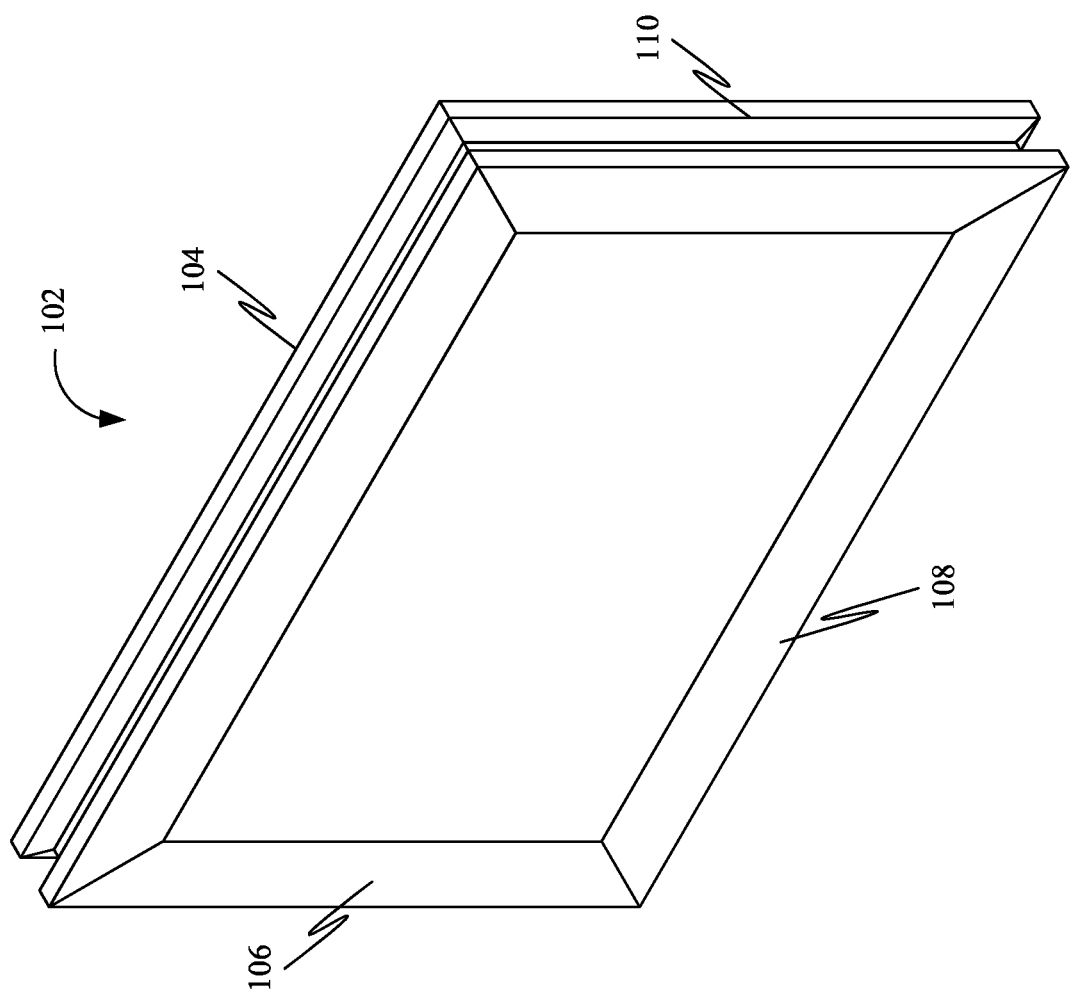
FIG. 2 is a perspective view of the frame of the insulated panel, in accordance with some embodiments.

FIG. 2 is a perspective view of the frame 102 of the insulated panel 100, in accordance with some embodiments.

Figure 3:
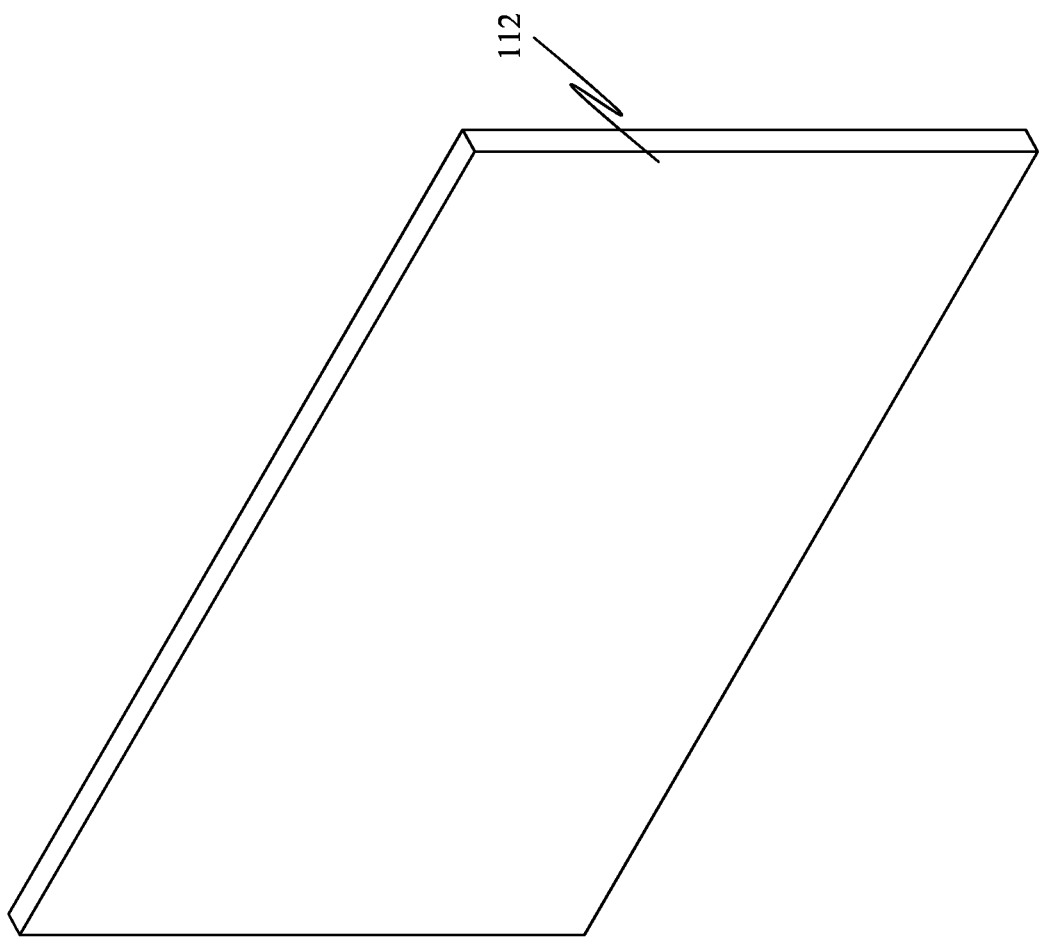
FIG. 3 is a perspective view of the first layer of the insulated panel, in accordance with some embodiments.

FIG. 3 is a perspective view of the first layer 112 of the insulated panel 100, in accordance with some embodiments.

FIG. 4 is a perspective view of the second layer 114 of the insulated panel 100, in accordance with some embodiments.

Figure 5:
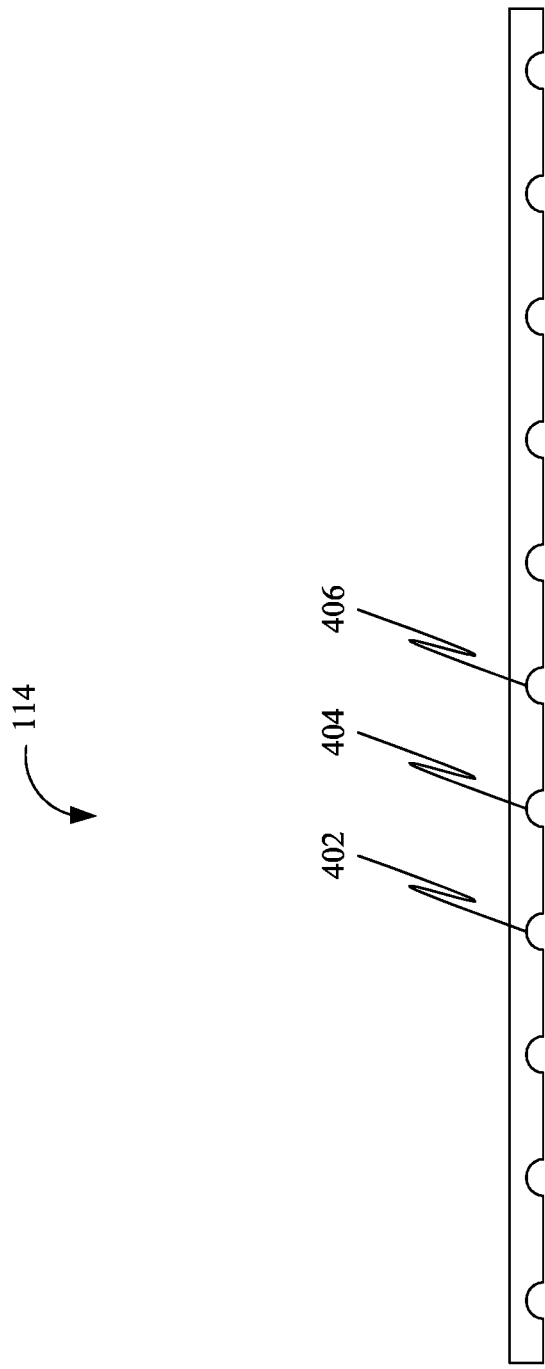
FIG. 5 is a top view of the second layer of the insulated panel, in accordance with some embodiments.

FIG. 5 is a top view of the second layer 114 of the insulated panel 100, in accordance with some embodiments.

Figure 6:
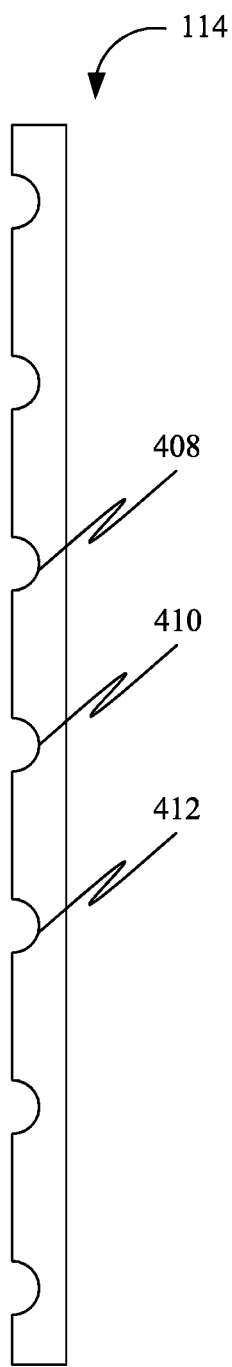
FIG. 6 is a side view of the second layer of the insulated panel, in accordance with some embodiments.

FIG. 6 is a side view of the second layer 114 of the insulated panel 100, in accordance with some embodiments.

Figure 7:
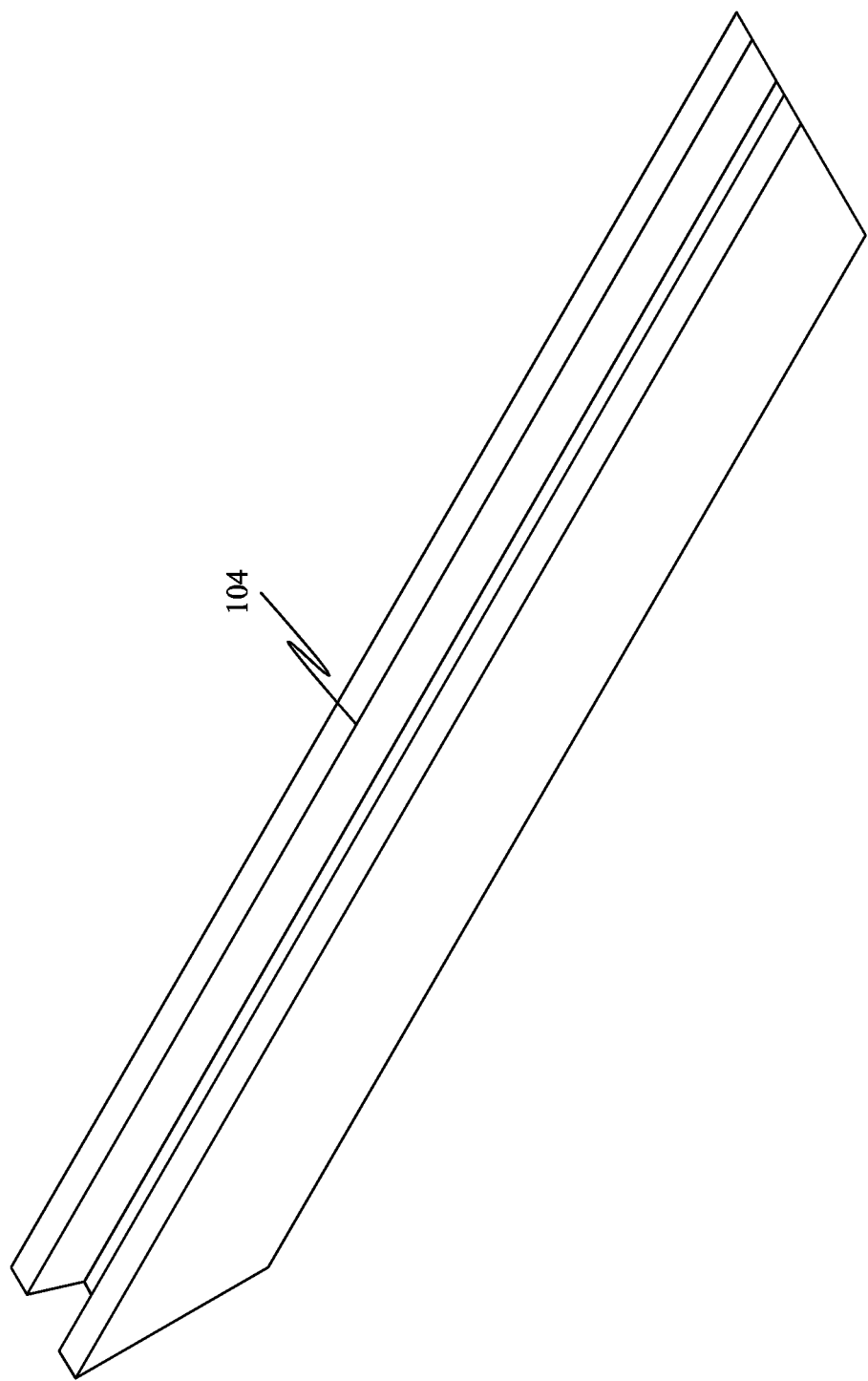
FIG. 7 is a perspective view of the at least one frame-end of the insulated panel, in accordance with some embodiments.

FIG. 7 is a perspective view of the at least one frame-end 104 of the insulated panel 100, in accordance with some embodiments.

Figure 8:
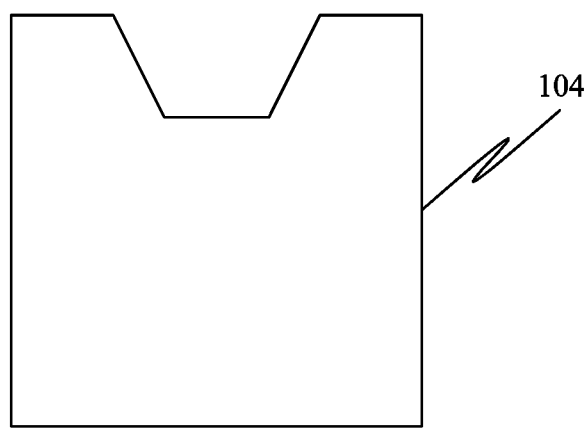
FIG. 8 is a side view of the at least one frame-end of the insulated panel, in accordance with some embodiments.

FIG. 8 is a side view of the at least one frame-end 104 of the insulated panel 100, in accordance with some embodiments.

Figure 9:
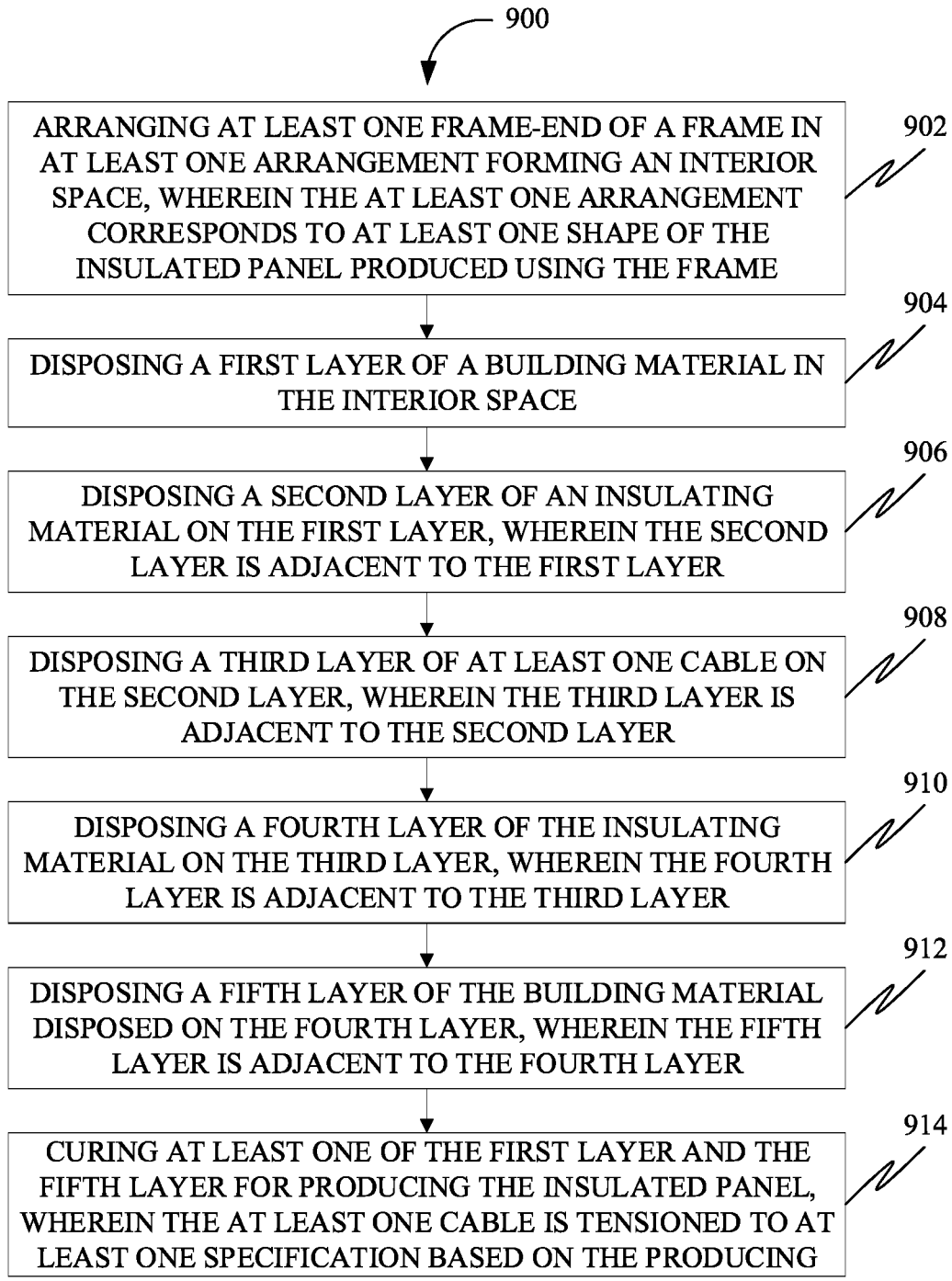
FIG. 9 is a flowchart of a method for producing an insulated panel for facilitating post-tensioning of the insulated panel, in accordance with some embodiments.

FIG. 9 is a flowchart of a method 900 for producing an insulated panel for facilitating post-tensioning of the insulated panel, in accordance with some embodiments. Further, at 902, the method 900 may include arranging at least one frame-end of a frame in at least one arrangement forming an interior space. Further, the at least one arrangement corresponds to at least one shape of the insulated panel produced using the frame. Further, a first end of the at least one frame-end may be coupled with a second end of the at least one frame-end. Further, in an embodiment, the at least one frame-end may include a W-channel bracket.

Further, at 904, the method 900 may include disposing a first layer of a building material in the interior space. Further, in an embodiment, the building material may include engineered cementitious composite (ECC) material. Further, the engineered cementitious composite material provides flexibility to the insulated panel.

Further, at 906, the method 900 may include disposing a second layer of an insulating material on the first layer. Further, the second layer may be adjacent to the first layer.

Further, at 908, the method 900 may include disposing a third layer of at least one cable on the second layer. Further, the third layer may be adjacent to the second layer.

Further, at 910, the method 900 may include disposing a fourth layer of the insulating material on the third layer. Further, the fourth layer may be adjacent to the third layer.

Further, at 912, the method 900 may include disposing a fifth layer of the building material disposed on the fourth layer. Further, the fifth layer may be adjacent to the fourth layer.

Further, at 914, the method 900 may include curing at least one of the first layer and the fifth layer for producing the insulated panel. Further, the at least one cable may be tensioned to at least one specification based on the producing.

Further, in some embodiments, the frame may include at least one frame side corresponding to the at least one frame-end. Further, the insulated panel may include at least one panel side corresponding to the at least one frame side.

In further embodiments, the method 900 may include disposing a plurality of dividers between a first frame side of at least one frame side of the frame and a second frame side of the at least one frame side. Further, the first frame side opposes the second frame side. Further, the plurality of dividers may include a plurality of channels. Further, a channel of the plurality of channels extends from a side face of a first divider of the plurality of dividers to a second divider of the plurality of dividers and a third divider of the plurality of dividers. Further, the second divider and the third divider may be disposed adjacently to the side face of the first divider. Further, the plurality of channels facilitates dispersing of a fluid material throughout the insulated panel. Further, the building material may include the fluid material.

Further, in some embodiments, the at least one frame-end may include a first frame-end, a second frame-end, a third frame-end, and a fourth frame-end. Further, the method 900 may include disposing the first frame-end, the second frame-end, the third frame-end, and the fourth frame-end adjacently forming the frame. Further, the first frame-end may be disposed on a first side of the insulated panel. Further, the second frame-end may be disposed on a second side of the insulated panel. Further, the third frame-end may be disposed on a third side of the insulated panel. Further, the fourth frame-end may be disposed on a fourth side of the insulated panel.

Further, in some embodiments, at least one of the second layer and the fourth layer may include at least one groove disposed on at least one of a first surface of the second layer and a second surface of the fourth layer. Further, the at least one of the first surface and the second surface may be adjacent to the third layer. Further, the at least one cable may be disposed on the at least one groove. Further, in an embodiment, the insulating material of the at least one of the second layer and the fourth layer may include foam material. Further, the at least one groove may be cut into the at least one of the first surface and the second surface.

In further embodiments, the method 900 may include arranging the at least one frame-end in a first arrangement of the at least one arrangement forming at least one first interior space and at least one first opening leading into the at least one first interior space. Further, the interior space may include the at least one first interior space. Further, at least one of the first layer, the second layer, the third layer, the fourth layer, and the fifth layer may be not disposed on the at least one first interior space.

In further embodiments, the method 900 may include arranging the at least one cable in a network grid of the at least one cable. Further, the insulated panel may be tensioned to the at least one specification based on the network grid.

Figure 10:
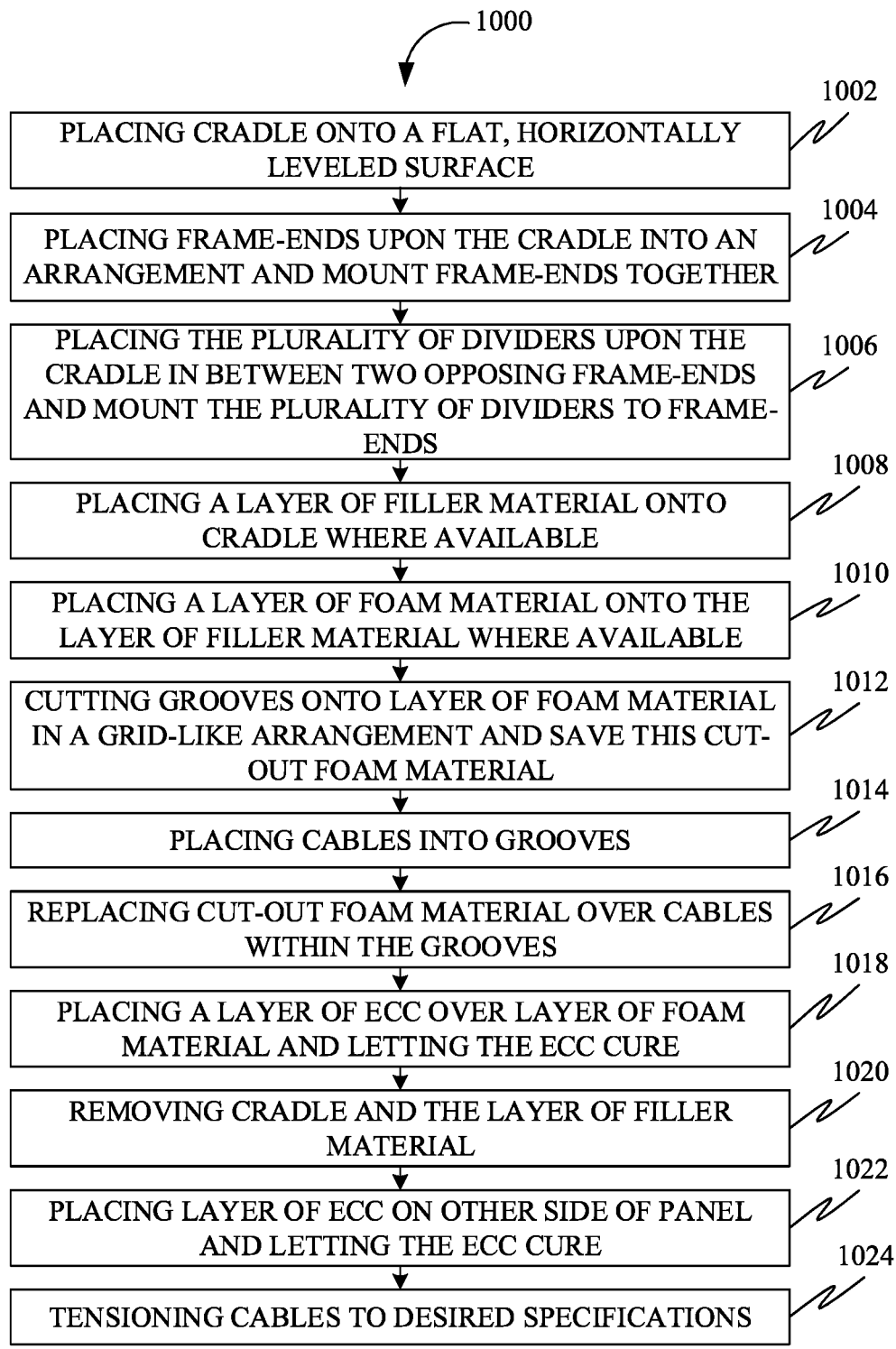
FIG. 10 is a flowchart of a method for producing an insulated panel for facilitating post-tensioning of the insulated panel, in accordance with some embodiments.

FIG. 10 is a flowchart of a method 1000 for producing an insulated panel for facilitating post-tensioning of the insulated panel, in accordance with some embodiments. Further, at 1002, the method 1000 may include placing cradle onto a flat, horizontally leveled surface. Further, at 1004, the method 1000 may include placing frame-ends upon the cradle into an arrangement and mount frame-ends together. Further, at 1006, the method 1000 may include placing the plurality of dividers upon the cradle in between two opposing frame-ends and mount the plurality of dividers to frame-ends. Further, at 1008, the method 1000 may include placing a layer of filler material onto cradle where available. Further, at 1010, the method 1000 may include placing a layer of foam material onto the layer of filler material where available. Further, at 1012, the method 1000 may include cutting grooves onto the layer of foam material in a grid-like arrangement and save this cut-out foam material. Further, at 1014, the method 1000 may include placing cables into grooves. Further, at 1016, the method 1000 may include replacing cut-out foam material over cables within the grooves. Further, at 1018, the method 1000 may include placing a layer of ECC (engineered cementitious composite) over the layer of foam material and letting the ECC cure. Further, at 1020, the method 1000 may include removing cradle and the layer of filler material. Further, at 1022, the method 1000 may include placing a layer of ECC on the other side of the panel and letting the ECC cure. Further, at 1024, the method 1000 may include tensioning cables to desired specifications.

Further, the may be first placed upon the flat, leveled, and horizontal surface. Further, the cradle may be of any shape, size, material, features, type or kind, orientation, location, quantity, components, and arrangements of components. However, it may be preferred that the cradle be of a material similar to and/or compatible with the material of the panel. It may be preferred that the cradle be such that the cradle may be similar to a flat, evenly leveled, supporting board. After the cradle may be placed upon and/or secured to a surface, the first frame-end through the fourth frame-end may be placed upon the surface of the cradle and arranged to match the overall shape of the panel. When the overall shape of the panel may be achieved by the arrangement of the first frame-end through the fourth frame-end, the first frame-end through the fourth frame-end may be then mounted together to each other. After the first frame-end through fourth frame-end may be secured to each other, the plurality of dividers may be placed upon the cradle in between two frame-end opposing to each other and mounted to the frame-ends of the panel. Next, the layer of filler material may be placed upon the cradle where space may be available. The layer of filler material may be of any shape, size, material, features, type or kind, orientation, location, quantity, components, and arrangements of components.

However, it may be preferred that the layer of filler material be of a material that may include, but not limited to, the following: oriented strand board filler sheets, other types of engineered wood sheets, and/or other similarly related materials. Further, the second layer of the panel may be placed upon the layer of filler material where space may be available, after the layer of filler material may be placed upon the cradle. Next, the grid of grooves may be cut out from the top surface of the second layer, with the cut-out portions of the second layer set aside for later involvement. Then, a network grid of cables may be laid onto the grid of grooves; culminating in the third layer of the panel. Next, the cut-out portions of the second layer, that was set aside previously, may be applied to the top face of the network grid of cables; culminating in the fourth layer of the panel. Then, the fifth layer of the panel may be applied over the surface of the panel containing the fourth layer ensuring that the fifth layer of the panel may be evenly dispersed throughout that surface of the panel. After the fifth layer of the panel may be cured, the panel may be flipped over so that the cradle and the layer of filler material may be removed. When the cradle and the layer of filler material may be removed from the panel, the first layer of the panel may be applied to the exposed surface of the second layer of the panel. When the first layer of the panel may be cured, finally, the network grid of cables may then be tensioned to the desired specification.

Figure 11:
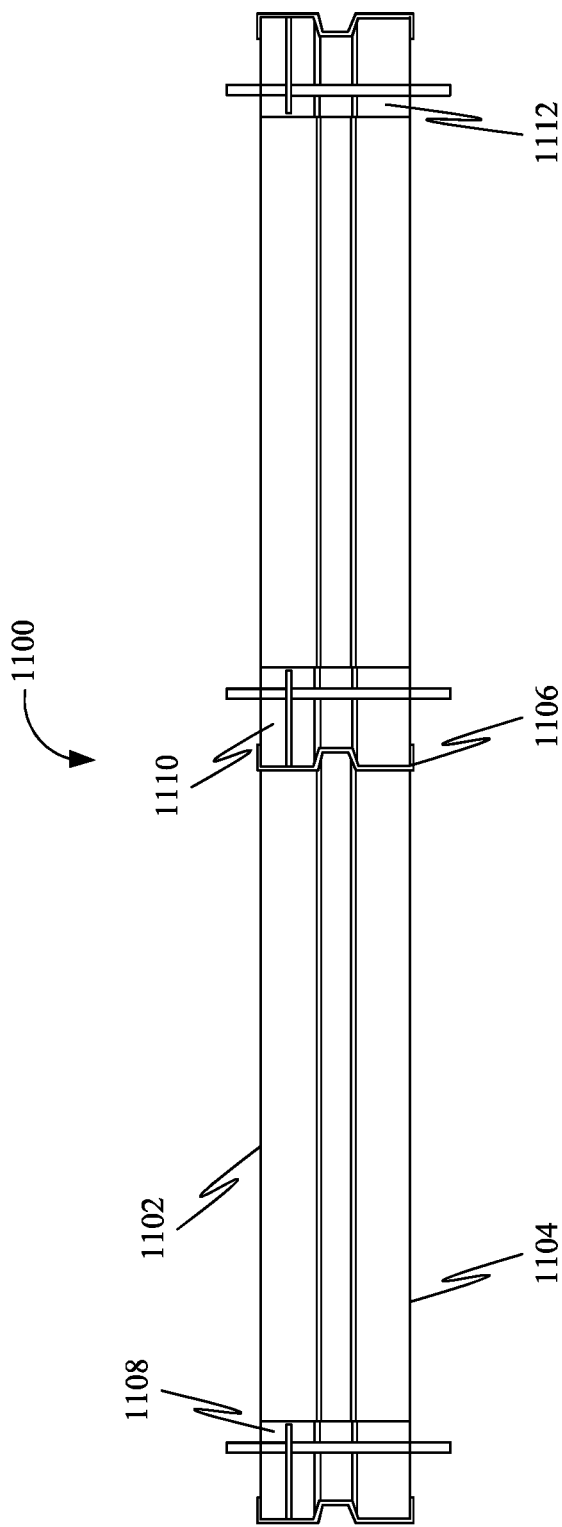
FIG. 11 is a top view of an insulated panel, in accordance with some embodiments.

FIG. 11 is a top view of an insulated panel 1100, in accordance with some embodiments. Further, the insulated panel 1100 may include a floor panel. Further, the floor panel may include at least one floor panel segment. Further, the insulated panel 1100 may include a frame 1102. Further, the frame 1102 may include at least one W-channel bracket 1104 and at least one intermediate W-channel bracket 1106. Further, a first floor panel segment may be coupled with a second floor panel segment using the at least one intermediate W-channel bracket 1106. Further, at least one end of at least one of the at least one W-channel bracket 1104 and the at least one intermediate W-channel bracket 1106 may include at least one floor corner bracket 1108-1112.

Figure 12:
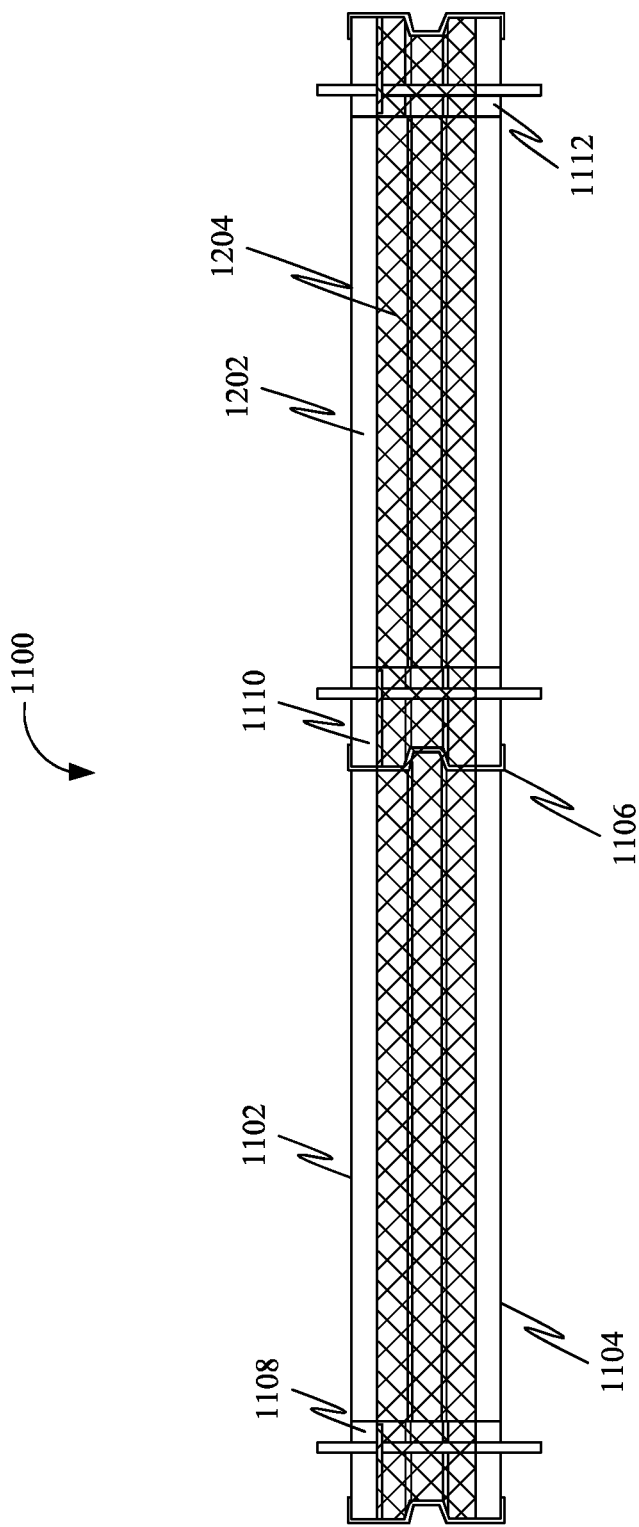
FIG. 12 is a cross-sectional view of the insulated panel, in accordance with some embodiments.

FIG. 12 is a cross-sectional view of the insulated panel 1100, in accordance with some embodiments. Further, the insulated panel 1100 may include a first layer 1202 of ECC material. Further, the insulated panel 1100 may include a second layer 1204 of foam material.

Figure 13:
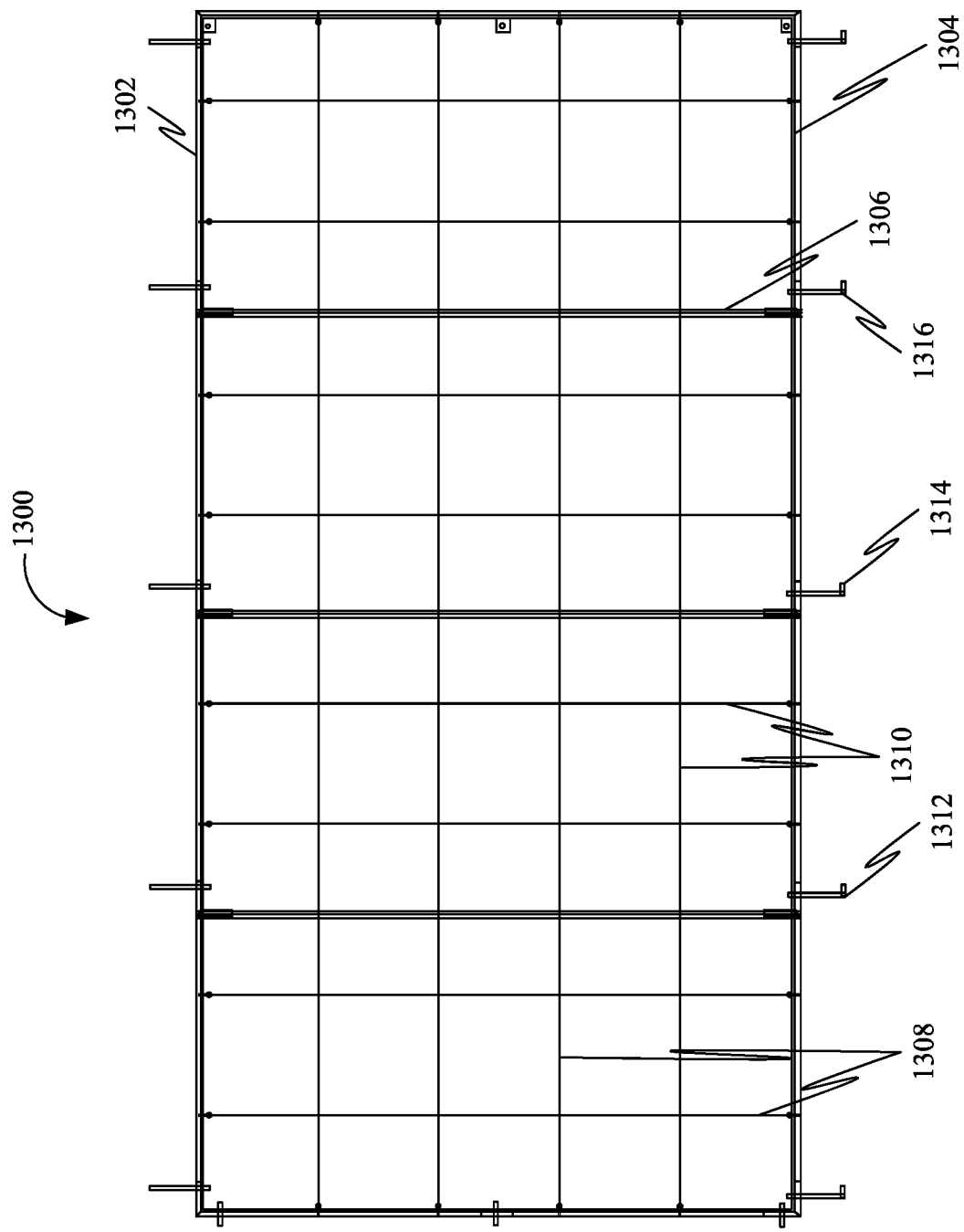
FIG. 13 is a front view of an insulated panel, in accordance with some embodiments.

FIG. 13 is a front view of an insulated panel 1300, in accordance with some embodiments. Further, the insulated panel 1300 may include a frame 1302. Further, the insulated panel 1300 may include a wall panel. Further, the wall panel may include at least one wall panel segment. Further, the frame 1302 may include at least one W-channel bracket 1304 and at least one intermediate W-channel bracket 1306. Further, a first wall panel segment and a second wall panel segment may be coupled using the at least one intermediate W-channel bracket 1306. Further, the frame 1302 may include at least one wire 1308-1310 disposed in the frame 1302. Further, the frame 1302 may include at least one bolt 1312-1316 protruding from the frame 1302. Further, the at least one bolt 1312-1316 may include a J-bolt.

Figure 14:
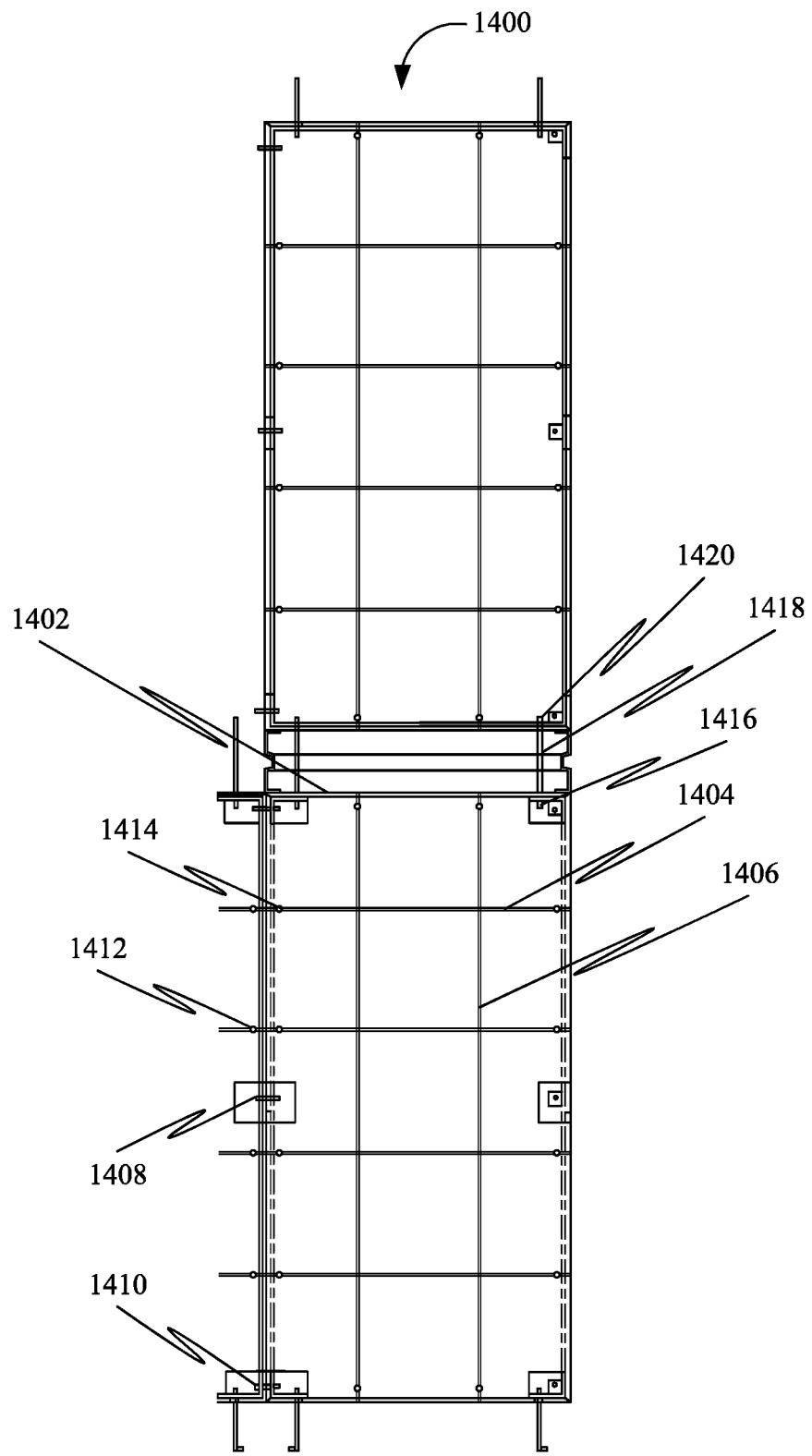
FIG. 14 is a front view of an insulated panel, in accordance with some embodiments.

FIG. 14 is a front view of an insulated panel 1400, in accordance with some embodiments. Further, the insulated panel 1400 may include a wall module. Further, the insulated panel 1400 may include a top bracket 1402. Further, the top bracket 1402 may be threaded for stud. Further, the insulated panel 1400 may include a cable network 1404-1406. Further, the insulated panel 1400 may include at least one bolt wall panel joint 1408-1410. Further, the insulated panel 1400 may include at least one eye bolt 1414. Further, the insulated panel 1400 may include at least one lock nut 1416. Further, the insulated panel 1400 may include at least one nut and washer 1418-1420. Further, at least one thread of the insulated panel 1400 may connect to at least one of a floor panel and a roof panel.

Figure 15:
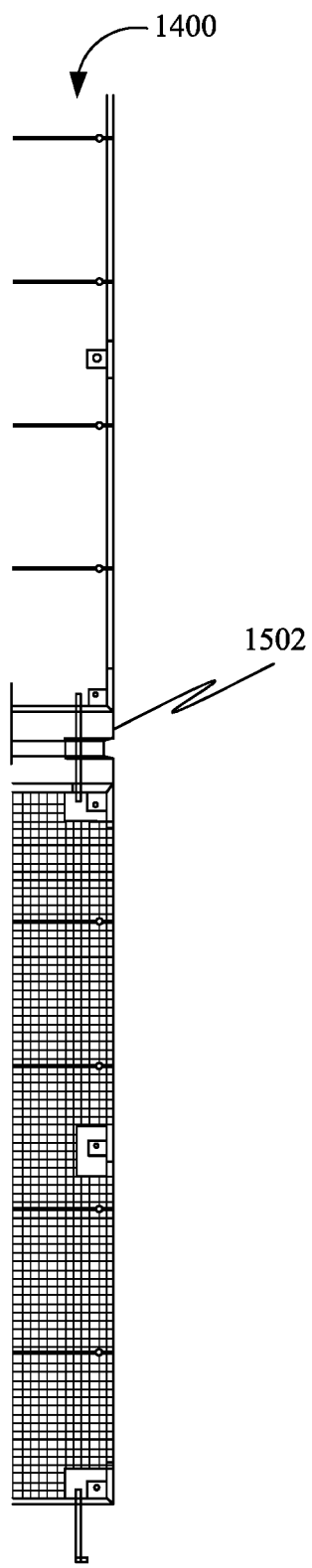
FIG. 15 is a partial front view of the insulated panel, in accordance with some embodiments.

FIG. 15 is a partial front view of the insulated panel 1400, in accordance with some embodiments. Further, the insulated panel 1400 may include at least one floor joint 1502.

Figure 16:
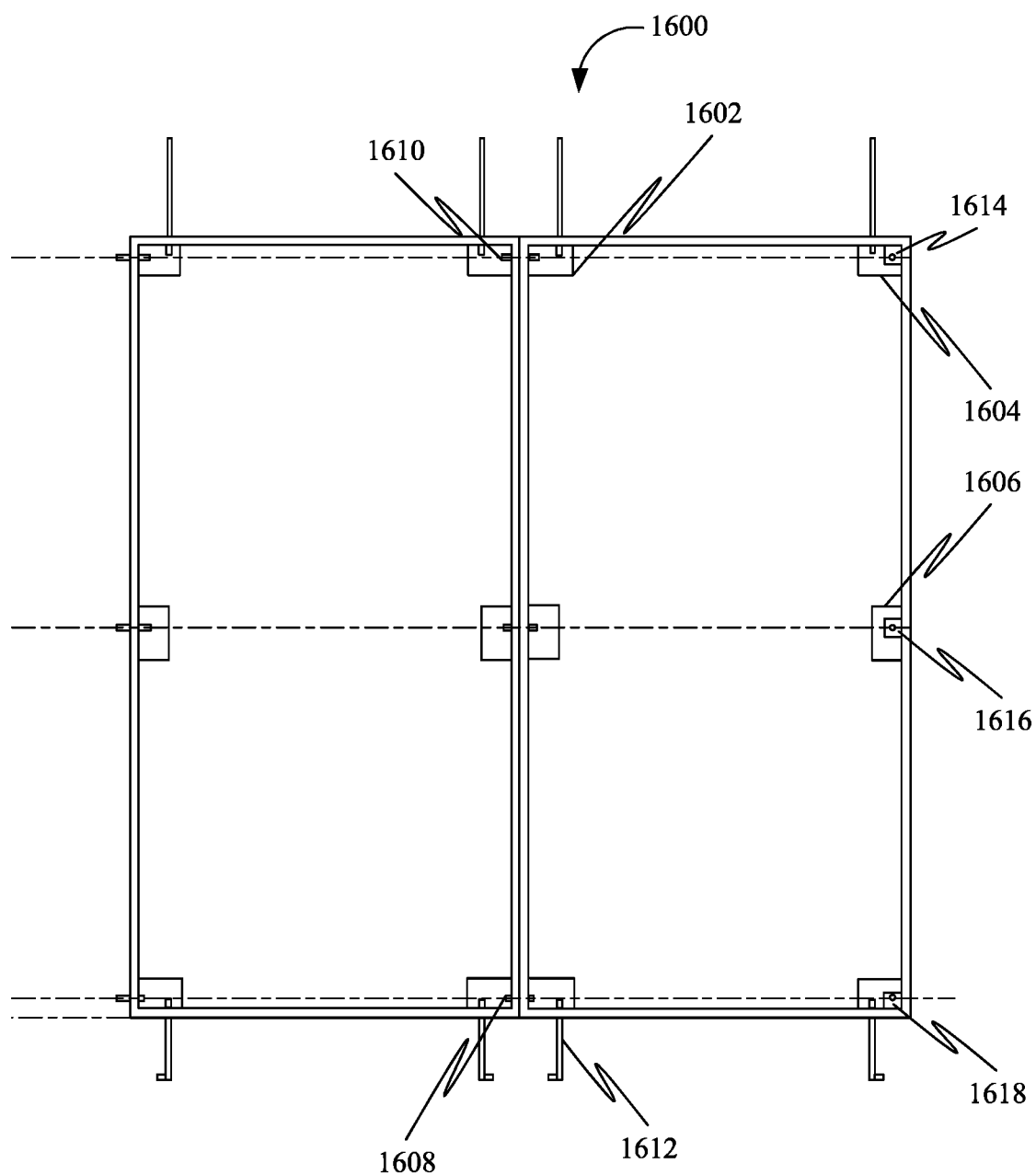
FIG. 16 is a front view of an insulated panel, in accordance with some embodiments.

FIG. 16 is a front view of an insulated panel 1600, in accordance with some embodiments. Further, the insulated panel 1600 may include at least one composite block-out box and connection point 1602-1606. Further, the insulated panel 1600 may include at least one bolt wall panel joint 1608-1610. Further, the insulated panel 1600 may include at least one J-bolt 1612. Further, the insulated panel 1600 may include at least one bolt corner joint 1614-1618. Further, the insulated panel 1600 may include at least one face. Further, the at least one face may include foam material and ECC material. Further, the foam material may be disposed in a core of the at least one face. Further, the ECC material may be poured on the at least one face.

Figure 17:
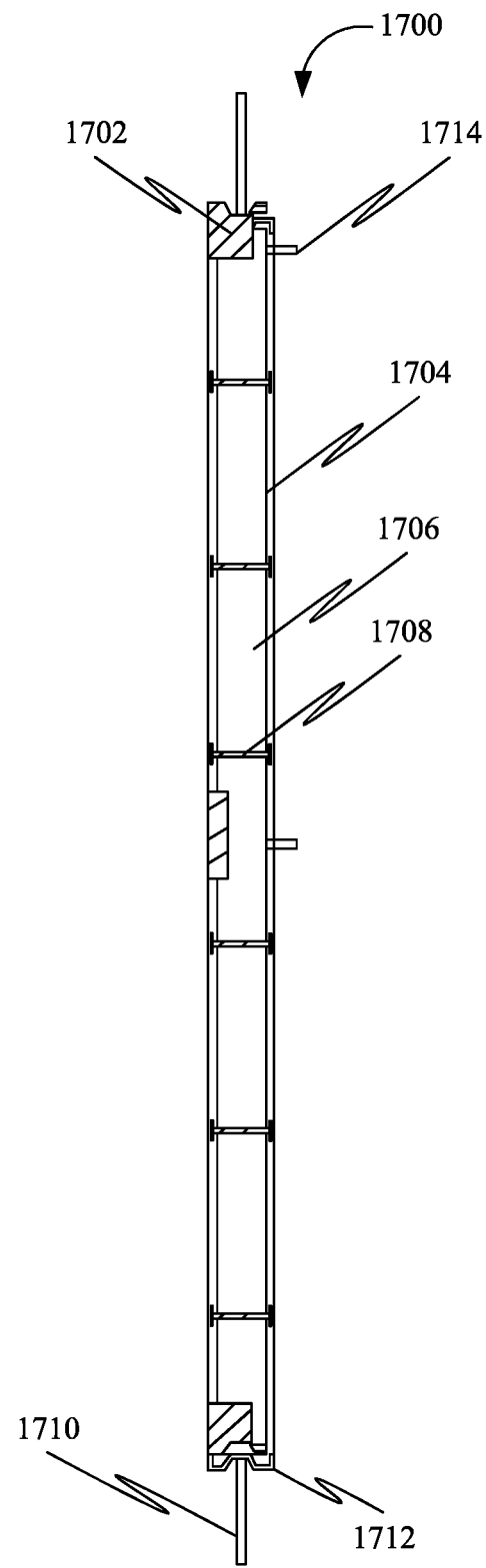
FIG. 17 is a side view of an insulated panel, in accordance with some embodiments.

FIG. 17 is a side view of an insulated panel 1700, in accordance with some embodiments. Further, the insulated panel 1700 may include a wall module. Further, the insulated panel 1700 may include at least one block-out box corner connection 1702. Further, the insulated panel 1700 may include a layer 1704 of high-early-strength ductile cementitious composite (HES-ECC) material. Further, the insulated panel 1700 may include a layer 1706 of foam material. Further, the insulated panel 1700 may include at least one modified brick tie 1708. Further, the insulated panel 1700 may include at least one J-bolt 1710. Further, the insulated panel 1700 may include at least one W-channel bracket 1712. Further, the insulated panel 1700 may include at least one bolt 1714. Further, the insulated panel 1700 may include at least one eye bolt.

Figure 18:
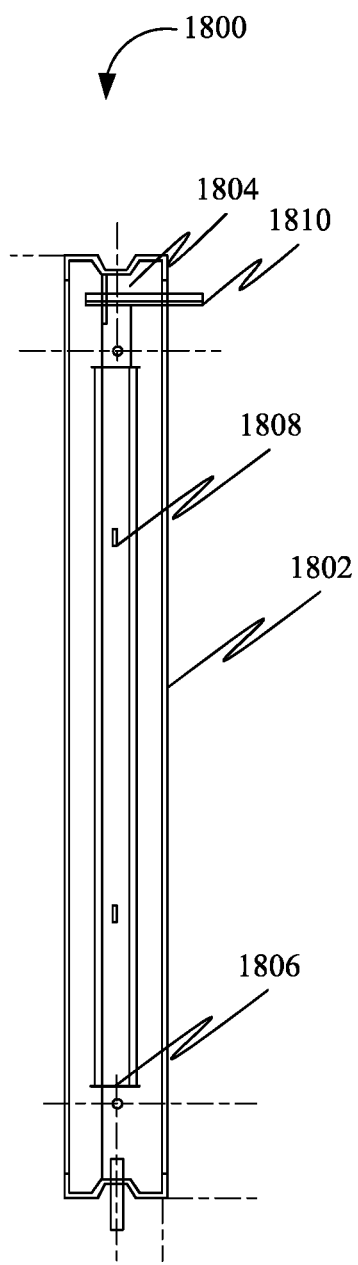
FIG. 18 is a top view of an insulated panel, in accordance with some embodiments.

FIG. 18 is a top view of an insulated panel 1800, in accordance with some embodiments. Further, the insulated panel 1800 may include at least one W-channel bracket 1802. Further, the insulated panel 1800 may include at least one corner bracket 1804-1806. Further, the insulated panel 1800 may include at least one eye bolt 1808. Further, the insulated panel 1800 may include at least one bolt 1810.

Figure 19:
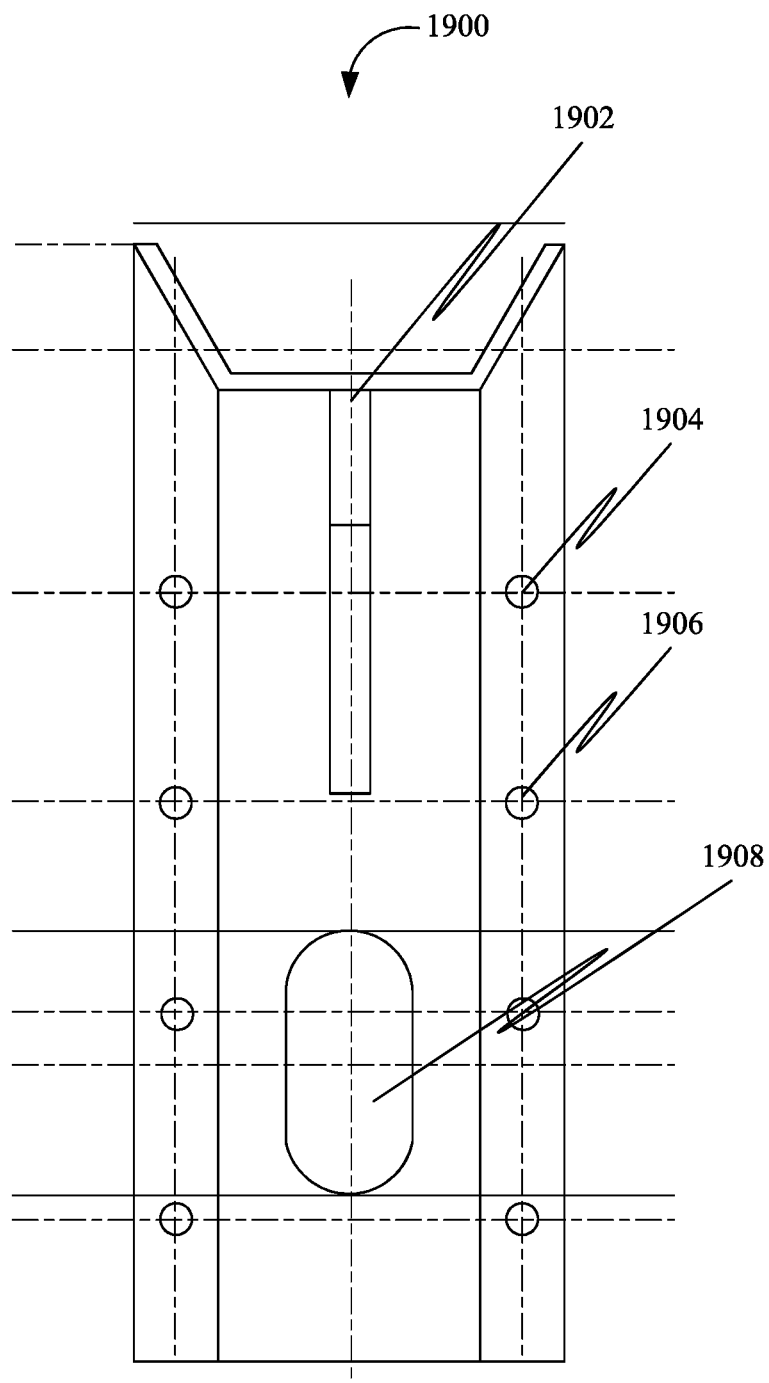
FIG. 19 a side view of a top corner bracket of an insulated panel, in accordance with some embodiments.

FIG. 19 a side view of a top corner bracket 1900 of an insulated panel, in accordance with some embodiments. Further, the top corner bracket 1900 may include at least one first threaded hole 1902. Further, the top corner bracket 1900 may include at least one second threaded hole 1904-1906. Further, the top corner bracket 1900 may include at least one slot 1908 for facilitating joining of walls.

Figure 20:
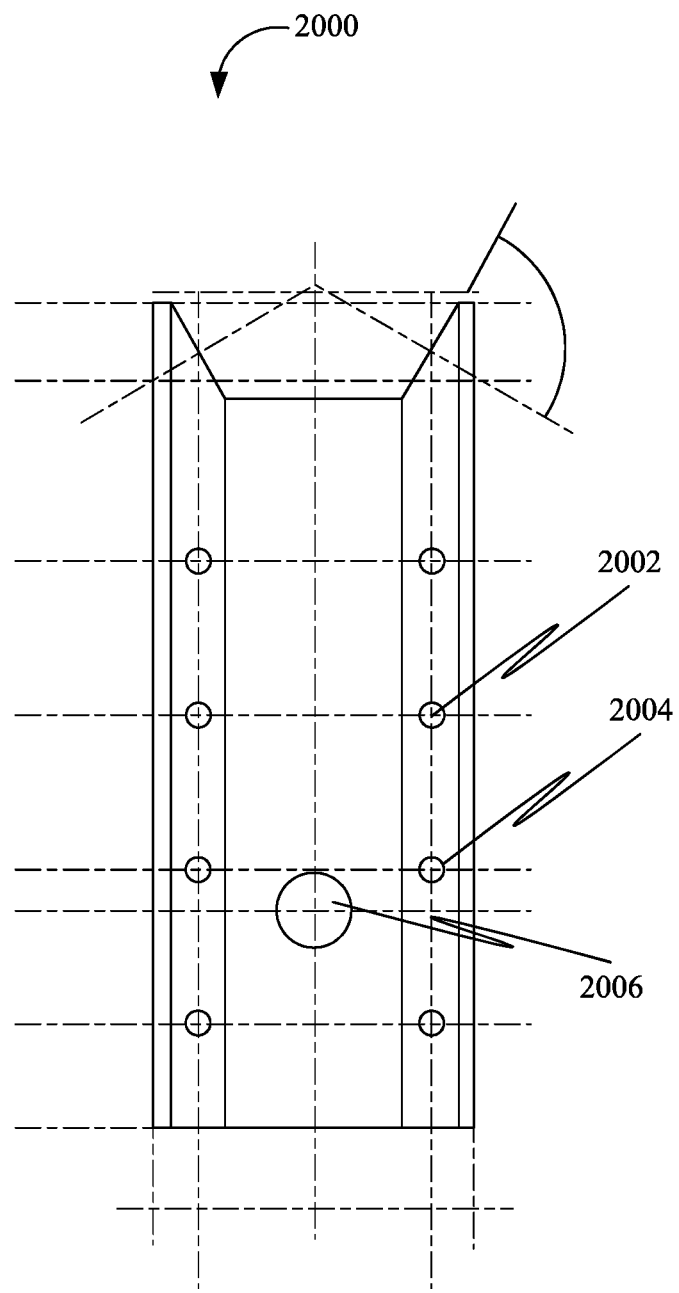
FIG. 20 is a top view of a top corner bracket of an insulated panel, in accordance with some embodiments.

FIG. 20 is a top view of a top corner bracket 2000 of an insulated panel, in accordance with some embodiments. Further, the top corner bracket 2000 may include at least one first threaded hole 2002-2004. Further, the top corner bracket 2000 may include at least one second threaded hole 2006.

Figure 21:
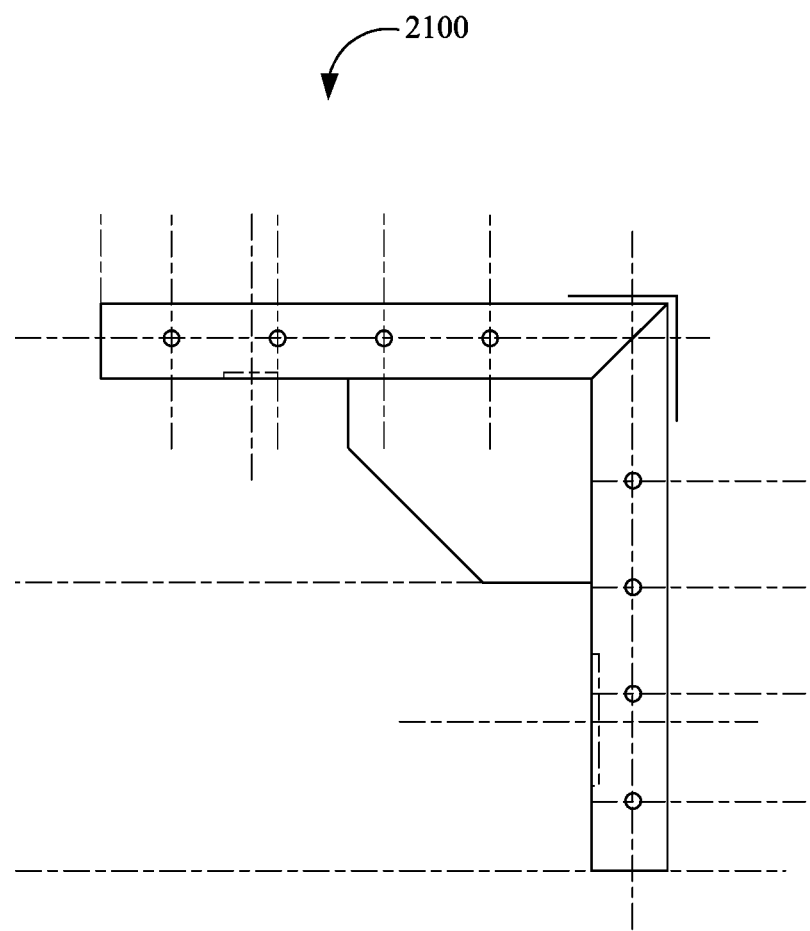
FIG. 21 is a front view of a top corner bracket of an insulated panel, in accordance with some embodiments.

FIG. 21 is a front view of a top corner bracket 2100 of an insulated panel, in accordance with some embodiments.

Figure 22:
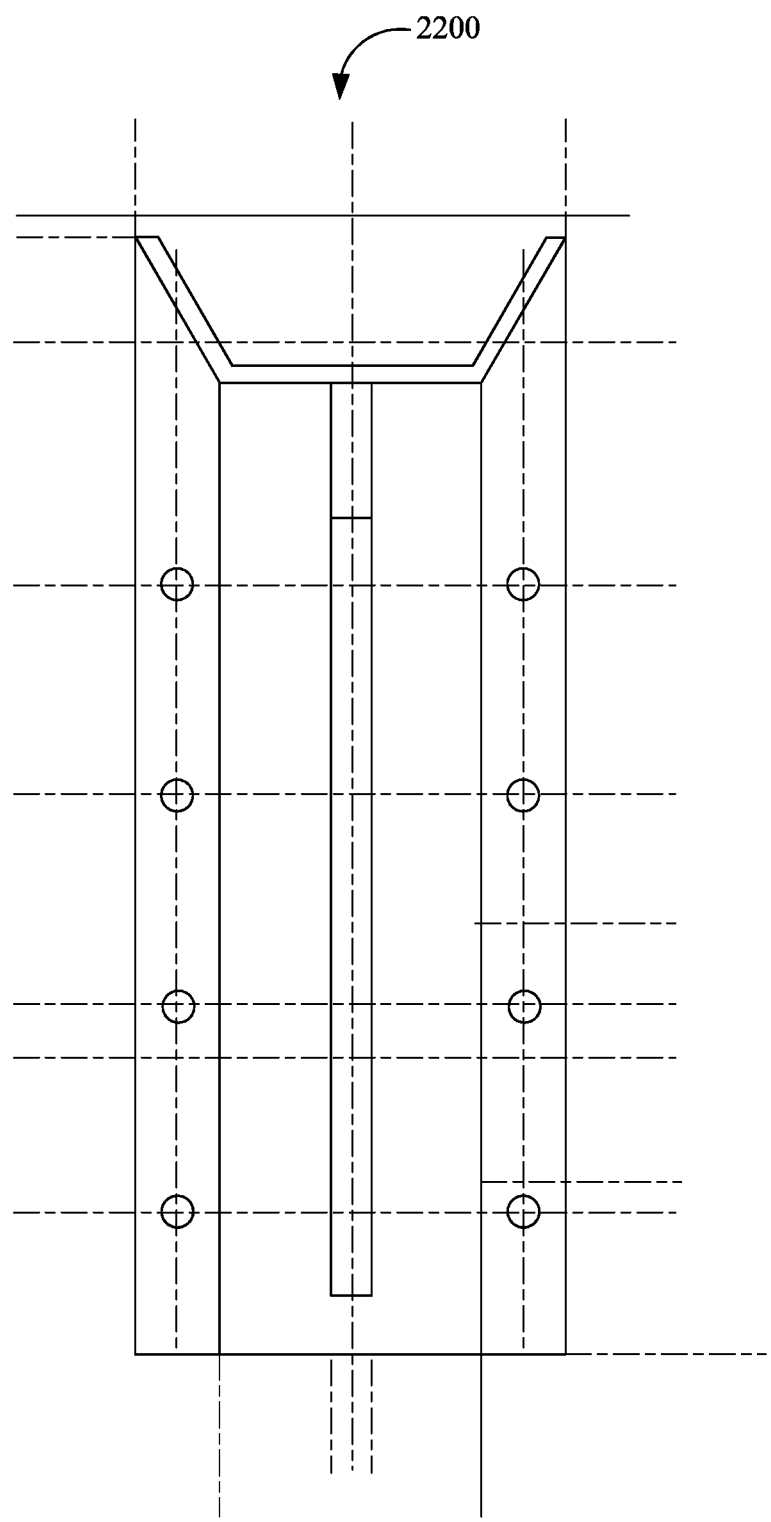
FIG. 22 is a side view of a top corner bracket of an insulated panel, in accordance with some embodiments.

FIG. 22 is a side view of a top corner bracket 2200 of an insulated panel, in accordance with some embodiments.

Figure 23:
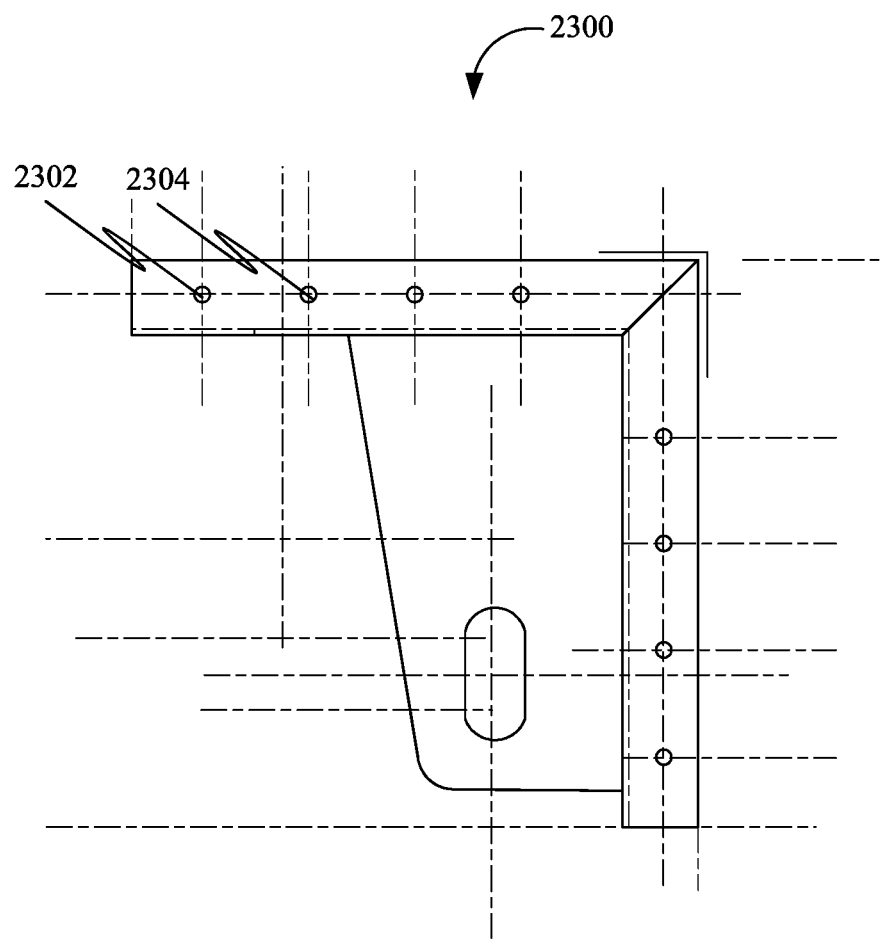
FIG. 23 is a front view of a top corner bracket of an insulated panel, in accordance with some embodiments.

FIG. 23 is a front view of a top corner bracket 2300 of an insulated panel, in accordance with some embodiments. Further, the top corner bracket 2300 bracket may include at least one threaded hole 2302-2304.

Figure 24:
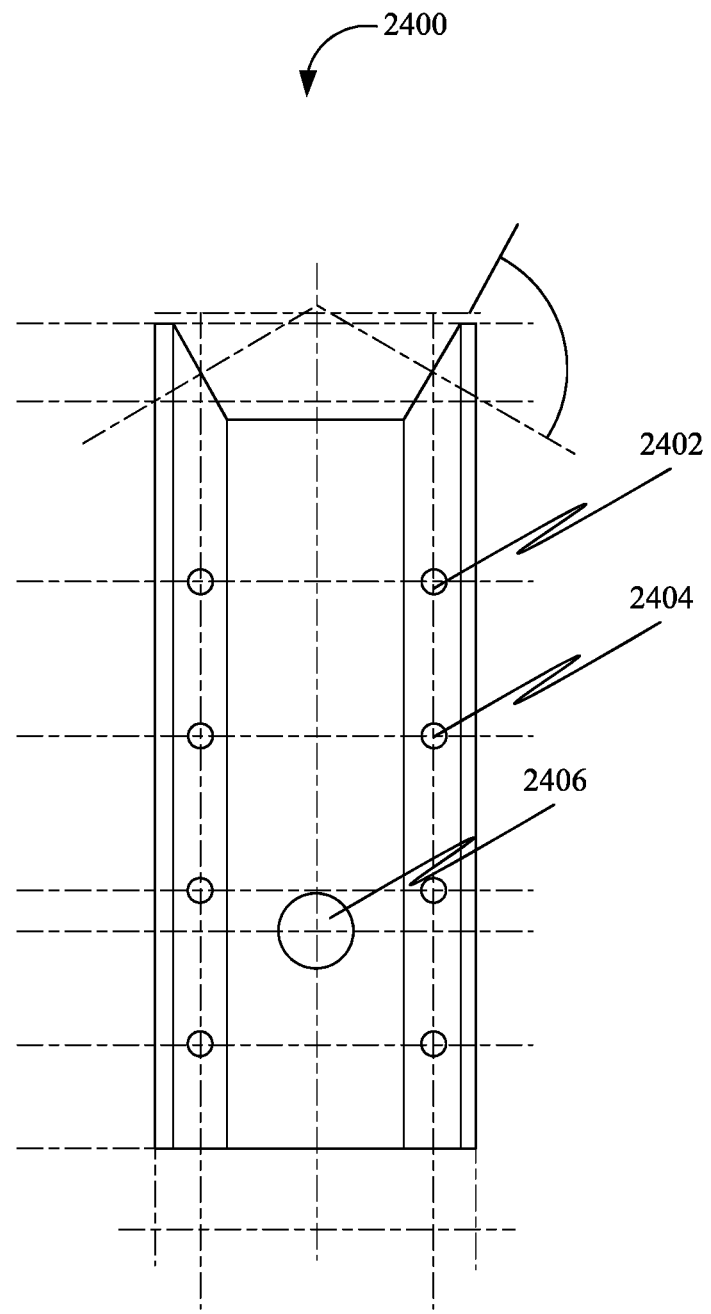
FIG. 24 is a top view of a top corner bracket of an insulated panel, in accordance with some embodiments.

FIG. 24 is a top view of a top corner bracket 2400 of an insulated panel, in accordance with some embodiments. Further, the top corner bracket 2400 may include at least one first threaded hole 2402-2404. Further, the top corner bracket 2400 may include at least one second threaded hole 2406.

Figure 25:
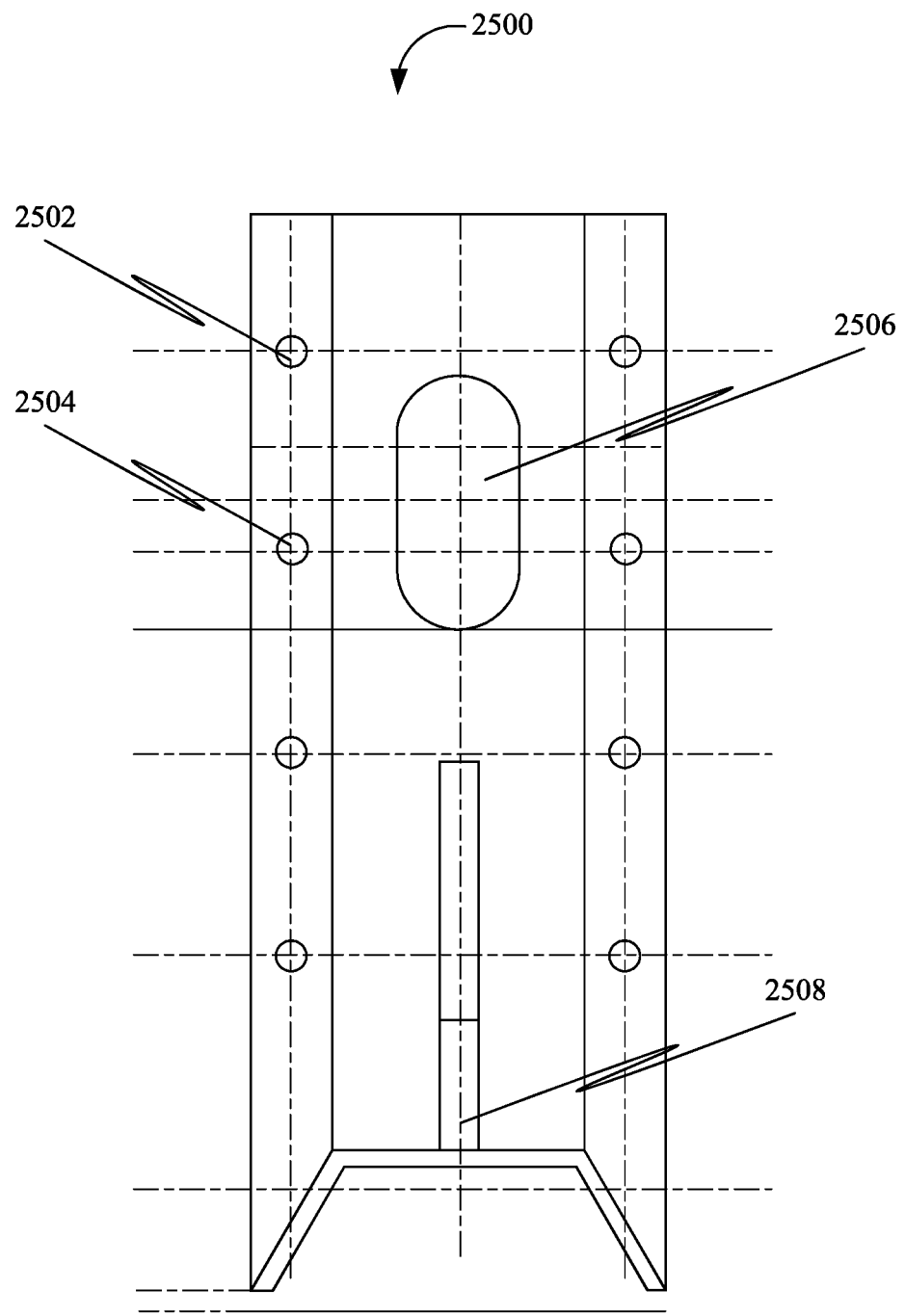
FIG. 25 is a side view of a bottom corner bracket of an insulated panel, in accordance with some embodiments.

FIG. 25 is a side view of a bottom corner bracket 2500 of an insulated panel, in accordance with some embodiments. Further, the bottom corner bracket 2500 may include at least one threaded hole 2502-2504. Further, the bottom corner bracket 2500 may include at least one slot 2506 for facilitating joining of a panel. Further, the bottom corner bracket 2500 may include at least one slot 2508. Further, the at least one slot may be associated with at least one J-bolt.

Figure 26:
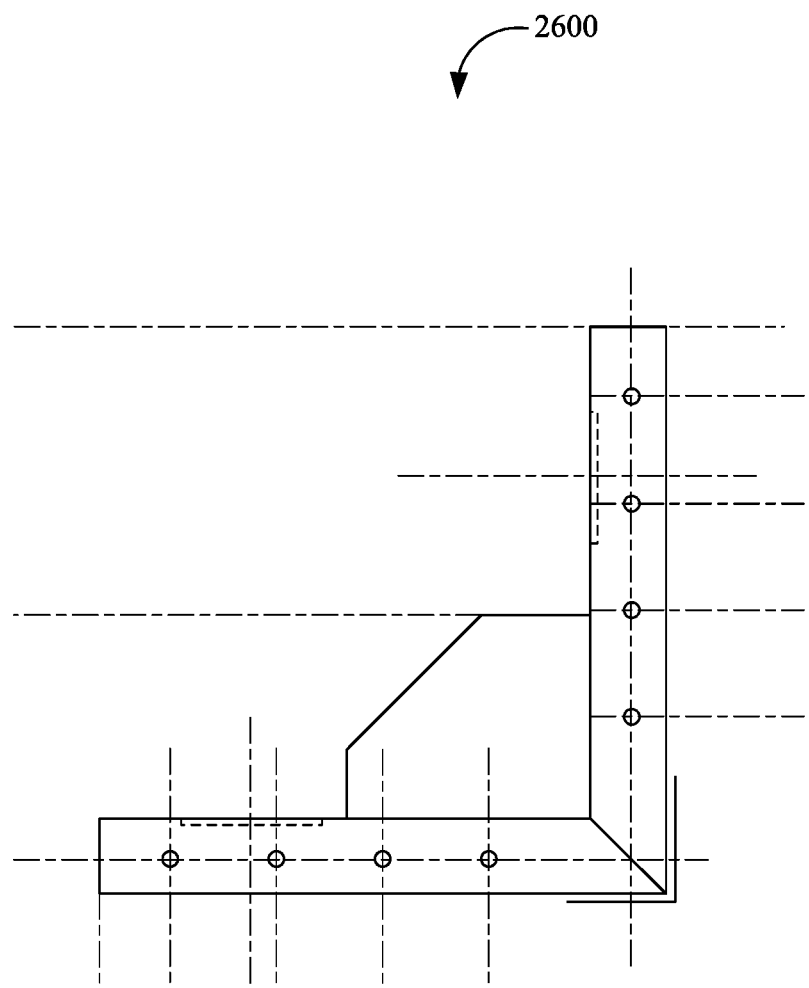
FIG. 26 is a front view of a bottom corner bracket of an insulated panel, in accordance with some embodiments.

FIG. 26 is a front view of a bottom corner bracket 2600 of an insulated panel, in accordance with some embodiments.

Figure 27:
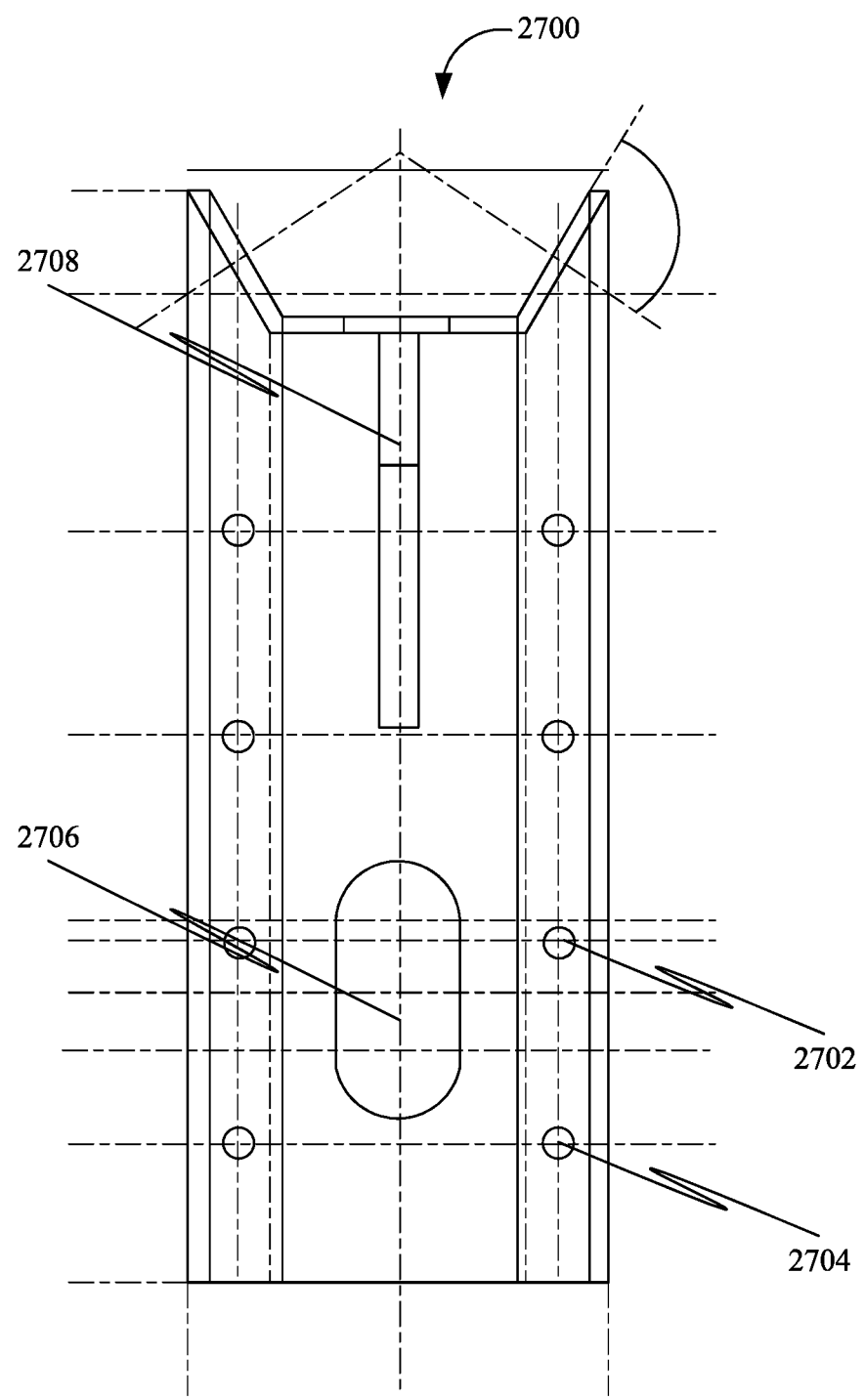
FIG. 27 is a top view of a bottom corner bracket of an insulated panel, in accordance with some embodiments.

FIG. 27 is a top view of a bottom corner bracket 2700 of an insulated panel, in accordance with some embodiments. Further, the bottom corner bracket 2700 may include at least one threaded hole 2702-2704. Further, the bottom corner bracket 2700 may include at least one slot 2706 for facilitating joining of a panel. Further, the bottom corner bracket 2700 may include at least one slot 2708. Further, the at least one slot 2708 may be associated with at least one J-bolt.

Figure 28:
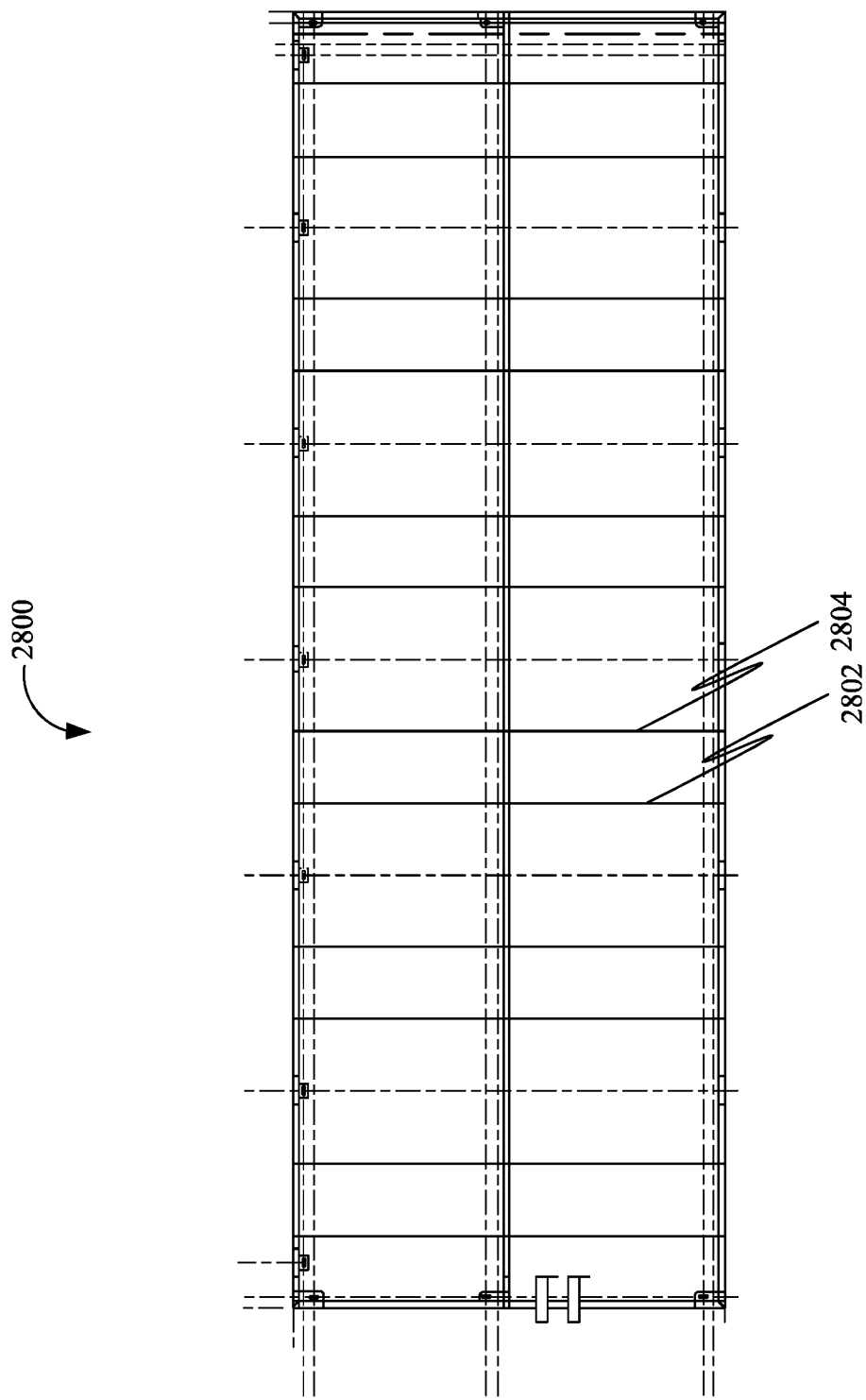
FIG. 28 is a front view of an insulated panel, in accordance with some embodiments.

FIG. 28 is a front view of an insulated panel 2800, in accordance with some embodiments. Further, the insulated panel 2800 may include a floor panel. Further, the insulated panel 2800 may include at least one cable 2802-2804.

Although the present disclosure has been explained in relation to its preferred embodiment, it is to be understood that many other possible modifications and variations can be made without departing from the spirit and scope of the disclosure.

The following is claimed:

1. An insulated panel for facilitating post-tensioning of the insulated panel, the insulated panel comprising:
   a frame comprising at least one frame-end arranged in at least one arrangement forming an interior space, wherein the at least one arrangement corresponds to at least one shape of the insulated panel produced using the frame, wherein a first end of the at least one frame-end is coupled with a second end of the at least one frame-end;
   a first layer of a building material disposed in the interior space;
   a second layer of foam insulating material disposed on the first layer, wherein the second layer is adjacent to the first layer;
   a third layer of at least one cable disposed on the second layer, wherein the third layer is adjacent to the second layer;
   a fourth layer of the foam insulating material disposed on the third layer, wherein the fourth layer is adjacent to the third layer;
   a fifth layer of the building material disposed on the fourth layer, wherein the fifth layer is adjacent to the fourth layer, wherein at least one of the first layer and the fifth layer is cured for producing the insulated panel;
   at least one of the second layer and the fourth layer comprises at least one groove cut into at least one of a first surface of the second layer and a second surface of the fourth layer;
   the at least one of the first surface and the second surface is adjacent to the third layer;
   each of the at least one cable is disposed on one of the at least one groove;
   the at least one cable is tensioned to at least one specification based on the producing;
   the frame comprises at least one frame side corresponding to the at least one frame-end;
   the insulated panel comprises at least one panel side corresponding to the at least one frame side;
   the at least one frame-end comprises a first frame-end, a second frame-end, a third frame-end, and a fourth frame-end;
   the first frame-end, the second frame-end, the third frame-end, and the fourth frame-end is disposed adjacently forming the frame;
   the first frame-end is disposed on a first side of the insulated panel;
   the second frame-end is disposed on a second side of the insulated panel;
   the third frame-end is disposed on a third side of the insulated panel;
   the fourth frame-end is disposed on a fourth side of the insulated panel;
   the at least one frame-end comprises a W-channel bracket;
   at least one composite block-out box corner connection;
   at least one bolt wall panel joint;
   the at least one composite block-out box corner connection connects to the at least one bolt wall panel joint;
   at least one J-bolt, and
      the at least one J-bolt protrudes from at least one frame-end.

2. The insulated panel of claim 1, wherein a plurality of dividers is disposed between a first frame side of at least one frame side of the frame and a second frame side of the at least one frame side, wherein the first frame side opposes the second frame side, wherein the plurality of dividers comprises a plurality of channels, wherein a channel of the plurality of channels extends from a side face of a first divider of the plurality of dividers to a second divider of the plurality of dividers and a third divider of the plurality of dividers, wherein the second divider and the third divider are disposed adjacently to the side face of the first divider, wherein the plurality of channels facilitates dispersing of a fluid material throughout the insulated panel, wherein the building material comprises the fluid material.

3. The insulated panel of claim 1, wherein the building material comprises engineered cementitious composite material, wherein the engineered cementitious composite material provides flexibility to the insulated panel.

4. The insulated panel of claim 1, wherein the at least one frame-end is arranged in a first arrangement of the at least one arrangement forming at least one first interior space and at least one first opening leading into the at least one first interior space, wherein the interior space comprises the at least one first interior space, wherein at least one of the first layer, the second layer, the third layer, the fourth layer, and the fifth layer is not disposed on the at least one first interior space.

5. The insulated panel of claim 1, wherein the at least one cable is arranged in a network grid of the at least one cable, wherein the insulated panel is tensioned to the at least one specification based on the network grid.

6. A method for producing an insulated panel for facilitating post-tensioning of the insulated panel, the method comprising:
   arranging at least one frame-end of a frame in at least one arrangement forming an interior space, wherein the at least one arrangement corresponds to at least one shape of the insulated panel produced using the frame, wherein a first end of the at least one frame-end is coupled with a second end of the at least one frame-end;

disposing a first layer of a building material in the interior space;

disposing a second layer of foam insulating material on the first layer, wherein the second layer is adjacent to the first layer;

disposing a third layer of at least one cable on the second layer, wherein the third layer is adjacent to the second layer;

disposing a fourth layer of the foam insulating material on the third layer, wherein the fourth layer is adjacent to the third layer;

disposing a fifth layer of the building material disposed on the fourth layer, wherein the fifth layer is adjacent to the fourth layer;

at least one of the second layer and the fourth layer comprises at least one groove cut into at least one of a first surface of the second layer and a second surface of the fourth layer;

the at least one of the first surface and the second surface is adjacent to the third layer;

the at least one cable is disposed on the at least one groove;

curing at least one of the first layer and the fifth layer for producing the insulated panel, wherein the at least one cable is tensioned to at least one specification based on the producing;

the frame comprises at least one frame side corresponding to the at least one frame-end;

the insulated panel comprises at least one panel side corresponding to the at least one frame side;

the at least one frame-end comprises a first frame-end, a second frame-end, a third frame-end, and a fourth frame-end;

the method comprises disposing the first frame-end, the second frame-end, the third frame-end, and the fourth frame-end adjacently forming the frame;

the first frame-end is disposed on a first side of the insulated panel;

the second frame-end is disposed on a second side of the insulated panel;

the third frame-end is disposed on a third side of the insulated panel;

the fourth frame-end is disposed on a fourth side of the insulated panel;

the at least one frame-end comprises a W-channel bracket;

at least one composite block-out box corner connection;

at least one bolt wall panel joint;

the at least one composite block-out box corner connection connects to the at least one bolt wall panel joint;

at least one J-bolt; and the at least one J-bolt protrudes from at least one frame-end.

7. The method of claim 6 further comprising disposing a plurality of dividers between a first frame side of at least one frame side of the frame and a second frame side of the at least one frame side, wherein the first frame side opposes the second frame side, wherein the plurality of dividers comprises a plurality of channels, wherein a channel of the plurality of channels extends from a side face of a first divider of the plurality of dividers to a second divider of the plurality of dividers and a third divider of the plurality of dividers, wherein the second divider and the third divider are disposed adjacently to the side face of the first divider, wherein the plurality of channels facilitates dispersing of a fluid material throughout the insulated panel, wherein the building material comprises the fluid material.

8. The method of claim 6, wherein the building material comprises engineered cementitious composite material, wherein the engineered cementitious composite material provides flexibility to the insulated panel.

9. The method of claim 6 further comprising arranging the at least one frame-end in a first arrangement of the at least one arrangement forming at least one first interior space and at least one first opening leading into the at least one first interior space, wherein the interior space comprises the at least one first interior space, wherein at least one of the first layer, the second layer, the third layer, the fourth layer, and the fifth layer is not disposed on the at least one first interior space.

10. The method of claim 6 further comprising arranging the at least one cable in a network grid of the at least one cable, wherein the insulated panel is tensioned to the at least one specification based on the network grid.

* * * * *